United States Patent
Zhou et al.

(10) Patent No.: US 10,798,054 B2
(45) Date of Patent: Oct. 6, 2020

(54) IP ADDRESS ALLOCATION METHOD IN D2D COMMUNICATION AND USER EQUIPMENT

(71) Applicant: Huawei Technologies Co., Ltd., Shenzhen (CN)

(72) Inventors: Runze Zhou, Shanghai (CN); Lin Shu, Shanghai (CN); Fenqin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/816,693

(22) Filed: Nov. 17, 2017

(65) Prior Publication Data

US 2018/0077112 A1 Mar. 15, 2018

Related U.S. Application Data

(63) Continuation of application No. PCT/CN2015/079209, filed on May 18, 2015.

(51) Int. Cl.
*H04L 29/12* (2006.01)
*H04W 76/14* (2018.01)
(Continued)

(52) U.S. Cl.
CPC ......... *H04L 61/2007* (2013.01); *H04W 76/10* (2018.02); *H04W 76/14* (2018.02);
(Continued)

(58) Field of Classification Search
CPC . H04L 61/2007; H04L 61/6022; H04L 67/14; H04W 76/10; H04W 76/14; H04W 88/02
See application file for complete search history.

(56) References Cited

U.S. PATENT DOCUMENTS

2003/0065801 A1* 4/2003 Eitel ................... H04M 3/5125
709/231
2003/0227937 A1 12/2003 Abrol et al.
(Continued)

FOREIGN PATENT DOCUMENTS

CN 101932120 A 12/2010
CN 103024737 A 4/2013
(Continued)

OTHER PUBLICATIONS

"Autonomous direct communication," SA WG2 Meeting #97, Busan, South Korea, S2-132215, pp. 1-7, 3rd Generation Partnership Project, Valbonne France (May 27-31, 2013).
(Continued)

*Primary Examiner* — Jenee Holland
(74) *Attorney, Agent, or Firm* — Leydig, Voit & Mayer, Ltd.

(57) ABSTRACT

An IP address allocation method for D2D communication includes: sending, by a first user equipment, a first message to a second user equipment, where the first message includes a first IP address allocated by the first user equipment to the second user equipment; and receiving, by the first user equipment, a second message sent by the second user equipment, where the second message is used to indicate whether allocation of the first IP address succeeds or fails.

8 Claims, 11 Drawing Sheets

(51) Int. Cl.
*H04W 76/10* (2018.01)
*H04L 29/08* (2006.01)
*H04W 88/02* (2009.01)
*H04W 76/18* (2018.01)
*H04W 8/26* (2009.01)

(52) U.S. Cl.
CPC .......... *H04L 61/6022* (2013.01); *H04L 67/14* (2013.01); *H04W 88/02* (2013.01)

(56) References Cited

U.S. PATENT DOCUMENTS

| | | | |
|---|---|---|---|
| 2004/0054781 A1* | 3/2004 | Chen | H04L 29/06 709/227 |
| 2005/0025107 A1* | 2/2005 | Usuba | H04L 12/12 370/340 |
| 2005/0080858 A1* | 4/2005 | Pessach | H04L 67/104 709/206 |
| 2005/0203851 A1* | 9/2005 | King | H04L 63/10 705/51 |
| 2005/0251577 A1* | 11/2005 | Guo | H04L 67/104 709/230 |
| 2007/0091872 A1* | 4/2007 | Bergenwall | H04L 67/104 370/352 |
| 2008/0159266 A1* | 7/2008 | Chen | H04L 29/12896 370/352 |
| 2008/0175383 A1* | 7/2008 | Sun | H04L 63/029 380/255 |
| 2008/0252925 A1* | 10/2008 | Ogasawara | H04L 29/12273 358/1.15 |
| 2009/0232022 A1* | 9/2009 | Savolainen | B07B 1/42 370/254 |
| 2010/0128601 A1* | 5/2010 | Bennett | H04L 45/00 370/225 |
| 2010/0248727 A1* | 9/2010 | Karaoguz | H04L 45/00 455/442 |
| 2011/0060649 A1* | 3/2011 | Dunk | G06Q 30/0255 705/14.53 |
| 2011/0087775 A1* | 4/2011 | Lee | H04L 67/104 709/224 |
| 2012/0082095 A1* | 4/2012 | Sun | H04L 61/10 370/328 |
| 2012/0096138 A1* | 4/2012 | Lambert | H04L 29/12254 709/223 |
| 2012/0113959 A1* | 5/2012 | Sugizaki | H04W 36/0016 370/331 |
| 2012/0208571 A1* | 8/2012 | Park | H04L 67/1063 455/466 |
| 2012/0210008 A1* | 8/2012 | Hsieh | H04L 61/1535 709/227 |
| 2012/0271912 A1 | 10/2012 | Cho et al. | |
| 2012/0290731 A1 | 11/2012 | Suumaeki et al. | |
| 2013/0057898 A1* | 3/2013 | Park | H04L 63/10 358/1.14 |
| 2013/0077611 A1* | 3/2013 | Shaikh | H04W 76/14 370/338 |
| 2013/0128311 A1* | 5/2013 | Kim | G06F 3/1296 358/1.15 |
| 2013/0223280 A1* | 8/2013 | Choi | H04W 76/10 370/254 |
| 2013/0223341 A1* | 8/2013 | Kim | H04W 8/005 370/328 |
| 2013/0250968 A1 | 9/2013 | Zhou et al. | |
| 2013/0287012 A1 | 10/2013 | Pragada et al. | |
| 2013/0322296 A1* | 12/2013 | Arunan | H04L 61/20 370/254 |
| 2014/0105145 A1* | 4/2014 | Gao | H04W 84/045 370/329 |
| 2014/0153513 A1* | 6/2014 | Lee | H04L 61/203 370/329 |
| 2014/0254523 A1* | 9/2014 | Chai | H04W 72/04 370/329 |
| 2014/0269646 A1* | 9/2014 | Ramasamy | H04W 76/14 370/338 |
| 2014/0331296 A1* | 11/2014 | Faccin | H04W 12/06 726/6 |
| 2014/0341041 A1* | 11/2014 | Velev | H04Q 3/0045 370/236 |
| 2014/0341112 A1 | 11/2014 | Agiwal et al. | |
| 2014/0341203 A1* | 11/2014 | Liu | H04W 12/06 370/338 |
| 2015/0156083 A1* | 6/2015 | Ni | H04L 43/028 370/236 |
| 2015/0282026 A1* | 10/2015 | Gupta | H04W 72/042 370/331 |
| 2015/0282236 A1 | 10/2015 | Chat et al. | |
| 2016/0044485 A1* | 2/2016 | Enomoto | H04W 76/14 455/41.2 |
| 2016/0050585 A1* | 2/2016 | Shan | H04B 7/0456 370/235 |
| 2016/0316496 A1* | 10/2016 | Dannebro | H04W 76/12 |
| 2017/0164188 A1 | 6/2017 | Choi et al. | |

FOREIGN PATENT DOCUMENTS

| | | |
|---|---|---|
| CN | 103139930 A | 6/2013 |
| CN | 104144403 A | 11/2014 |
| JP | 2005073271 A | 3/2005 |
| JP | 2012147422 A | 8/2012 |
| KR | 20120123211 A | 11/2012 |
| KR | 20130097265 A | 9/2013 |
| RU | 2338329 C2 | 11/2008 |
| WO | 2006003739 A1 | 1/2006 |
| WO | 2012068728 A1 | 5/2012 |
| WO | 2014193557 A1 | 12/2014 |

OTHER PUBLICATIONS

"Updates to network independent one-to-one communication," SA WG2 Meeting #98 S2-132458 (was S2-131820), Valencia, Spain, (Jul. 15-19, 2013).
"One-to-one ProSe Direct Communication considerations",SA WG2 Meeting #104 S2-142442(was S2-14xxxx), Dublin, Ireland (Jul. 7-11 2014).
"3rd Generation Partnership Project; Technical Specification Group Services and System Aspects;Proximity-based services (ProSe); Stage 2 (Release 12)," 3GPP TS 23.303 V124.0, pp. 1-63, 3rd Generation Partnership Project, Valbonne, France (Mar. 2015).
"3rd Generation Partnership Project; Technical Specification Group Core Network and Terminals; Proximity-services ,(ProSe) User Equipment (UE) to ProSe function protocol aspects; Stage 3 (Release 12)," 3GPP TS 24.334 V12.2.0, pp. 1-92, 3rd Generation Partnership Project, Valbonne, France (Mar. 2015).

* cited by examiner

Control plane interface (PC5-U)

IP ADDRESS ALLOCATION METHOD IN D2D COMMUNICATION AND USER EQUIPMENT

CROSS-REFERENCE TO RELATED APPLICATIONS

This application is a continuation of International Application No. PCT/CN2015/079209, filed on May 18, 2015, the disclosure of which is hereby incorporated by reference in its entirety.

TECHNICAL FIELD

Embodiments of the present invention relate to communications technologies, and in particular, to an IP address allocation method in D2D communication and user equipment.

BACKGROUND

With high-speed development of mobile communication, a Long Term Evolution (LTE) network system provides many services of new types for a user, for example, data services such as surfing the Internet with a mobile phone, and instant chat, and wide use of the data services increases a bandwidth requirement of the user. Device-to-device (D2D) communication allows direct communication between user equipments (UEs), and the user equipments may share spectrum resources with a cell user under control of a cell network. This effectively improves utilization of the spectrum resources. Currently, D2D communication has been applied to the LTE network system.

D2D communication includes one-to-many communication (One to many communication), that is, group communication, and one-to-one communication (One to one communication). In the one-to-one communication, a sending party UE needs to learn an address of a receiving party UE for performing D2D communication with the receiving party UE. The address specifically includes a layer-2 address of the receiving party UE, that is, a device address of the receiving party UE, and a network address of the receiving party UE, that is, an Internet Protocol (IP) address. Specifically, the layer-2 address is used by the two user equipments that perform the D2D communication to perform signaling interaction, and the IP address is used by the two parties that perform the D2D communication to perform data interaction. The layer-2 address of the receiving party UE may be obtained by the sending party UE in a D2D discovery or pre-configuration manner. In this case, the sending party UE performs signaling interaction with the receiving party UE, so that one party UE of the D2D communication to obtain an IP address of the other party UE.

In the prior art, both a sending party UE and a receiving party UE may serve as an allocator of an IP address, or serve as a receiver of an IP address. When both the sending party UE and the receiving party UE serve as an allocator of an IP address, the IP address may be repeatedly allocated. For example, both the sending party UE and the receiving party UE may serve as a Dynamic Host Configuration Protocol (DHCP) server and allocate an IP address of an IPv4 type; or both the sending party UE and the receiving party UE may serve as an IP router and allocate an IP address of an IPv6 type. When both the sending party UE and the receiving party UE serve as a receiver of an IP address, the IP address may not be allocated. The foregoing two problems may cause a failure in establishing a D2D communication connection.

SUMMARY

Embodiments of the present invention provide an IP address allocation method in D2D communication and user equipment, to avoid a case, in which an IP address is repeatedly allocated or an IP address is not allocated, caused because both a sending party UE and a receiving party UE may serve as an allocator of an IP address or serve as a receiver of an IP address in an IP address allocation process of prior-art D2D communication, and improve a success rate of establishing a D2D communication connection.

According to a first aspect, an embodiment of the present invention provides an IP address allocation method in D2D communication, including:

sending, by a first user equipment (UE), a first message to a second user equipment, where the first message includes a first IP address allocated by the first user equipment to the second user equipment; and receiving, by the first user equipment, a second message sent by the second user equipment, where the second message is used to indicate whether allocation of the first IP address succeeds or fails.

In a first possible implementation manner of the first aspect, the first message includes a first packet data network (PDN) type, and the first PDN type is used to indicate a type, of an IP address, supported by the first user equipment.

According to the first aspect or the first possible implementation manner of the first aspect, in a second possible implementation manner, when the second message is used to indicate that allocation of the first IP address fails, the second message includes at least one of a second PDN type or a cause value, the second PDN type is used to indicate a type, of an IP address, supported by the second user equipment, and the cause value is used to indicate that the second user equipment does not support a type of the first IP address.

According to the second possible implementation manner of the first aspect, in a third possible implementation manner, when the second message includes the second PDN type, the method further includes:

if the first user equipment determines, according to the second message, that the first user equipment supports the second PDN type, allocating, by the first user equipment, a second IP address to the second user equipment, and sending the second IP address to the second user equipment, where the second IP address is used by the second user equipment to establish a device-to-device (D2D) communication connection between the second user equipment and the first user equipment; or if the first user equipment determines, according to the second message, that the first user equipment does not support the second PDN type, sending, by the first user equipment, a feedback message to the second user equipment, where the feedback message is used to indicate that establishment of a D2D communication connection fails.

According to the second possible implementation manner of the first aspect, in a fourth possible implementation manner, when the second message includes the cause value but does not include the second PDN type, the method further includes:

if the first user equipment supports an IP address of another type excluding the type of the first IP address, allocating, by the first user equipment, a second IP address to the second user equipment, and sending the second IP address to the second user equipment, where the second IP address is used by the second user equipment to establish a D2D communication connection between the second user equipment and the first user equipment; or if the first user equipment does not support an IP address of another type excluding the type of the first IP address, sending, by the first user equipment, a feedback message to the second user equipment, where the feedback message is used to indicate that establishment of a D2D communication connection fails.

According to the second possible implementation manner of the first aspect, in a fifth possible implementation manner, when the first message includes the first PDN type, the second message includes the cause value, and the cause value is further used to indicate that the second user equipment supports the first PDN type, the method further includes:

allocating, by the first user equipment, a second IP address of the first PDN type to the second user equipment, and sending the second IP address to the second user equipment, where the second IP address is used by the second user equipment to establish a device-to-device (D2D) communication connection between the second user equipment and the first user equipment.

According to the second possible implementation manner of the first aspect, in a sixth possible implementation manner, when the first message includes the first PDN type, the second message includes the cause value but does not include the second PDN type, and the cause value is further used to indicate that the second user equipment does not support the first PDN type, the method further includes:

if the first user equipment supports an IP address of another type excluding the type of the first IP address and the first PDN type, allocating, by the first user equipment, a second IP address to the second user equipment, and sending the second IP address to the second user equipment, where the second IP address is used by the second user equipment to establish a D2D communication connection between the second user equipment and the first user equipment; or if the first user equipment does not support an IP address of another type excluding the type of the first IP address and the first PDN type, sending, by the first user equipment, a feedback message to the second user equipment, where the feedback message is used to indicate that establishment of a D2D communication connection fails.

According to any one of the first aspect, or the first to the sixth implementation manners of the first aspect, in a seventh possible implementation manner, the first message further includes an identity, and the identity is used to indicate that the second user equipment is to determine, according to the identity, that the first user equipment is an allocator of an IP address in D2D communication, or the identity is used to indicate that the second user equipment is a receiver of an IP address in D2D communication.

According to any one of the first aspect, or the first to the seventh implementation manners of the first aspect, in an eighth possible implementation manner, before the sending, by the first user equipment, a first message to the second user equipment, the method further includes:

obtaining, by the first user equipment, a second PDN type of the second user equipment; and allocating, by the first user equipment, the first IP address to the second user equipment according to the second PDN type of the second user equipment.

According to any one of the first aspect, or the first to the eighth implementation manners of the first aspect, in a ninth possible implementation manner, before the sending, by the first user equipment, a first message to the second user equipment, the method further includes:

receiving, by the first user equipment, a third message sent by the second user equipment; and allocating, by the first user equipment, the first IP address to the second user equipment according to the third message.

According to a second aspect, an embodiment of the present invention provides an IP address allocation method in D2D communication, including:

receiving, by a second user equipment (UE), a first message sent by a first user equipment, where the first message includes a first IP address allocated by the first user equipment to the second user equipment; and sending, by the second user equipment, a second message to the first user equipment, where the second message is used to indicate whether allocation of the first IP address succeeds or fails.

In a first possible implementation manner of the second aspect, the sending, by the second user equipment, a second message to the first user equipment includes:

if the second user equipment determines, according to the first message, that the second user equipment does not support a type of the first IP address, sending, by the second user equipment, the second message to the first user equipment, where the second message is used to indicate that allocation of the first IP address fails, the second message includes at least one of a second packet data network (PDN) type or a cause value, the cause value is used to indicate that the second user equipment does not support the type of the first IP address, and the second PDN type is used to indicate a type, of an IP address, supported by the second user equipment; or if the first message further includes a first PDN type, and the second user equipment determines, according to the first message, that the second user equipment does not support a type of the first IP address but the second user equipment supports the first PDN type, sending, by the second user equipment, the second message to the first user equipment, where the second message is used to indicate that allocation of the first IP address fails, the second message includes at least one of a second PDN type or a cause value, and the cause value is used to indicate that the second user equipment does not support the type of the first IP address but the second user equipment supports the first PDN type; or if the first message further includes a first PDN type, and the second user equipment determines, according to the first message, that the second user equipment does not support a type of the first IP address and the second user equipment does not support the first PDN type, sending, by the second user equipment, the second message to the first user equipment, where the second message is used to indicate that allocation of the first IP address fails, the first PDN type is used to indicate a type, of an IP address, supported by the first user equipment, the second message includes at least one of a second PDN type or a cause value, the cause value is used to indicate that the second user equipment does not support the type of the first IP address and the second user equipment does not support the first PDN type, and the second PDN type is used to indicate a type, of an IP address, supported by the second user equipment; or if the second user equipment supports a type of the first IP address, sending, by the second user equipment, the second message to the first user equipment, where the second message is used to indicate that allocation of the first IP address succeeds.

According to the second aspect or the first possible implementation manner of the second aspect, in a second possible implementation manner, when the second message is used to indicate that allocation of the first IP address fails, the method further includes:

receiving, by the second user equipment, a second IP address sent by the first user equipment, where the second IP address is used by the second user equipment to establish a device-to-device (D2D) communication connection between the second user equipment and the first user equipment; or receiving, by the second user equipment, a feedback message sent by the first user equipment, where the feedback message is used to indicate that establishment of a D2D communication connection fails.

According to any one of the second aspect, or the first to the second implementation manners of the second aspect, in a third possible implementation manner, the first message further includes an identity, and the method further includes:

determining, by the second user equipment according to the identity, that the first user equipment is an allocator of an IP address in D2D communication or that the second user equipment is a receiver of an IP address in D2D communication.

According to any one of the second aspect, or the first to the third implementation manners of the second aspect, in a fourth possible implementation manner, before the receiving, by the second user equipment, a first message sent by the first user equipment, the method further includes:

sending, by the second user equipment, a third message to the first user equipment, where the third message is used to request the first user equipment to allocate the first IP address to the second user equipment.

According to a third aspect, an embodiment of the present invention provides an IP address allocation method in D2D communication, where a first IP address is pre-configured in a first user equipment (UE), a second IP address is pre-configured in a second user equipment, and the method includes:

sending, by the first user equipment, a first message to the second user equipment, where the first message includes the first IP address and indication information, the indication information is used to indicate that the first user equipment is to use the first IP address, the indication information is further used to indicate that the second user equipment is to use the second IP address, and the first message is used to request the second user equipment to establish a device-to-device (D2D) communication connection to the first user equipment according to the first IP address; and receiving, by the first user equipment, a second message sent by the second user equipment, where the second message is used to indicate that establishment of the D2D communication connection succeeds.

According to a fourth aspect, an embodiment of the present invention provides an IP address allocation method in D2D communication, where a first IP address is pre-configured in a first user equipment user equipment, a second IP address is pre-configured in a second user equipment, and the method includes:

sending, by the first user equipment, a first message to the second user equipment, where the first message includes indication information, the indication information is used to indicate that the first user equipment is to use the first IP address, the indication information is further used to indicate that the second user equipment is to use the second IP address, and the indication information is further used to indicate that the first user equipment is an establisher of a device-to-device (D2D) communication connection; and receiving, by the first user equipment, a second message sent by the second user equipment, where the second message includes the second IP address, so that the first user equipment establishes a device-to-device (D2D) communication connection to the second user equipment according to the second IP address.

In a first possible implementation manner of the fourth aspect, the first message further includes a packet data network (PDN) type, and the PDN type indicates a type of an IP address used by the second user equipment; and the second IP address in the second message is added by the second user equipment according to the indication information and the PDN type.

According to a fifth aspect, an embodiment of the present invention provides a user equipment, including:

a transmitter, configured to send a first message to a peer user equipment, where the first message includes a first IP address allocated by the user equipment to the peer user equipment; and a receiver, configured to receive a second message sent by the peer user equipment, where the second message is used to indicate whether allocation of the first IP address succeeds or fails.

In a first possible implementation manner of the fifth aspect, the first message includes a first packet data network (PDN) type, and the first PDN type is used to indicate a type, of an IP address, supported by the user equipment.

According to the fifth aspect or the first possible implementation manner of the fifth aspect, in a second possible implementation manner, when the second message is used to indicate that allocation of the first IP address fails, the second message includes at least one of a second PDN type or a cause value, the second PDN type is used to indicate a type, of an IP address, supported by the peer user equipment, and the cause value is used to indicate that the peer user equipment does not support a type of the first IP address.

According to the second possible implementation manner of the fifth aspect, in a third possible implementation manner, when the second message includes the second PDN type, the user equipment further includes a processor, configured to allocate a second IP address to the peer user equipment when determining, according to the second message, that the user equipment supports the second PDN type, and the transmitter is further configured to send, to the peer user equipment, the second IP address allocated by the processor, where the second IP address is used by the peer user equipment to establish a device-to-device (D2D) communication connection between the peer user equipment and the user equipment; or the processor is further configured to determine, according to the second message, that the user equipment does not support the second PDN type, and the transmitter is further configured to send a feedback message to the peer user equipment, where the feedback message is used to indicate that establishment of a D2D communication connection fails.

According to the second possible implementation manner of the fifth aspect, in a fourth possible implementation manner, when the second message includes the cause value but does not include the second PDN type, the user equipment further includes a processor, configured to allocate a second IP address to the peer user equipment when the user equipment supports an IP address of another type excluding the type of the first IP address, and the transmitter is further configured to send, to the peer user equipment, the second IP address allocated by the processor, where the second IP address is used by the peer user equipment to establish a D2D communication connection between the peer user equipment and the user equipment; or the processor is further configured to determine that the user equipment does not support an IP address of another type excluding the type of the first IP address, and the transmitter is further configured to send a feedback message to the peer user equipment, where the feedback message is used to indicate that establishment of a D2D communication connection fails.

According to the second possible implementation manner of the fifth aspect, in a fifth possible implementation manner, when the first message includes the first PDN type, the second message includes the cause value, and the cause value is further used to indicate that the peer user equipment supports the first PDN type, the user equipment further includes a processor, configured to allocate a second IP address of the first PDN type to the peer user equipment; and the transmitter is further configured to send the second IP address to the peer user equipment, where the second IP address is used by the peer user equipment to establish a device-to-device (D2D) communication connection between the peer user equipment and the user equipment.

According to the second possible implementation manner of the fifth aspect, in a sixth possible implementation manner, when the first message includes the first PDN type, the second message includes the cause value but does not include the second PDN type, and the cause value is further used to indicate that the peer user equipment does not support the first PDN type, the user equipment further includes a processor, configured to allocate a second IP address to the peer user equipment when the user equipment supports an IP address of another type excluding the type of the first IP address and the first PDN type. and the transmitter is further configured to send the second IP address to the peer user equipment, where the second IP address is used by the peer user equipment to establish a D2D communication connection between the peer user equipment and the user equipment; or the processor is further configured to determine that the user equipment does not support an IP address of another type excluding the type of the first IP address and the first PDN type, and the transmitter is further configured to send a feedback message to the peer user equipment, where the feedback message is used to indicate that establishment of a D2D communication connection fails.

According to any one of the fifth aspect, or the first to the sixth implementation manners of the fifth aspect, in a seventh possible implementation manner, the first message further includes an identity, and the identity is used to indicate that the peer user equipment is to determine, according to the identity, that the user equipment is an allocator of an IP address in D2D communication, or the identity is used to indicate that the peer user equipment is a receiver of an IP address in D2D communication.

According to any one of the fifth aspect, or the first to the seventh implementation manners of the fifth aspect, in an eighth possible implementation manner, the receiver is further configured to obtain a second PDN type of the peer user equipment before the transmitter sends the first message to the peer user equipment, and the user equipment further includes:

the processor, configured to allocate the first IP address to the peer user equipment according to the second PDN type of the peer user equipment.

According to any one of the fifth aspect, or the first to the eighth implementation manners of the fifth aspect, in a ninth possible implementation manner, the receiver is further configured to: before the transmitter sends the first message to the peer user equipment, receive a third message sent by the peer user equipment, and the user equipment further includes:

the processor, configured to allocate the first IP address to the peer user equipment according to the third message.

According to a sixth aspect, an embodiment of the present invention provides a user equipment, including:

a receiver, configured to receive a first message sent by a peer user equipment, where the first message includes a first IP address allocated by the peer user equipment to the user equipment; and a transmitter, configured to send a second message to the peer user equipment, where the second message is used to indicate whether allocation of the first IP address succeeds or fails.

In a first possible implementation manner of the sixth aspect, the user equipment further includes a processor, and that the transmitter is configured to send the second message to the peer user equipment includes:

the transmitter is specifically configured to send the second message to the peer user equipment when the processor determines, according to the first message, that the user equipment does not support a type of the first IP address, where the second message is used to indicate that allocation of the first IP address fails, the second message includes at least one of a second packet data network (PDN) type or a cause value, the cause value is used to indicate that the user equipment does not support the type of the first IP address, and the second PDN type is used to indicate a type, of an IP address, supported by the user equipment; or the transmitter is specifically configured to send the second message to the peer user equipment when the first message further includes a first PDN type, and the processor determines, according to the first message, that the user equipment does not support a type of the first IP address but the user equipment supports the first PDN type, where the second message is used to indicate that allocation of the first IP address fails, the second message includes at least one of a second PDN type or a cause value, and the cause value is used to indicate that the user equipment does not support the type of the first IP address but the user equipment supports the first PDN type; or the transmitter is specifically configured to send the second message to the peer user equipment when the first message further includes a first PDN type, and the processor determines, according to the first message, that the user equipment supports neither a type of the first IP address nor the first PDN type, where the second message is used to indicate that allocation of the first IP address fails, the first PDN type is used to indicate a type, of an IP address, supported by the peer user equipment, the second message includes at least one of a second PDN type or a cause value, the cause value is used to indicate that the user equipment supports neither the type of the first IP address nor the first PDN type, and the second PDN type is used to indicate a type, of an IP address, supported by the user equipment; or the transmitter is specifically configured to send the second message to the peer user equipment when the processor determines that the user equipment supports a type of the first IP address, where the second message is used to indicate that allocation of the first IP address succeeds.

According to the sixth aspect or the first possible implementation manner of the sixth aspect, in a second possible implementation manner, when the second message is used to indicate that allocation of the first IP address fails, the receiver is further configured to receive a second IP address sent by the peer user equipment, where the second IP address is used by the user equipment to establish a device-to-device (D2D) communication connection between the user equipment and the peer user equipment; or the receiver is further configured to receive a feedback message sent by the peer user equipment, where the feedback message is used to indicate that establishment of a D2D communication connection fails.

According to any one of the sixth aspect, or the first to the second implementation manners of the sixth aspect, in a third possible implementation manner, the first message further includes an identity, and the user equipment further includes the processor, configured to determine, according to the identity, that the peer user equipment is an allocator of an IP address in D2D communication or that the user equipment is a receiver of an IP address in D2D communication.

According to any one of the sixth aspect, or the first to third implementation manners of the sixth aspect, in a fourth possible implementation manner, the transmitter is further configured to send a third message to the peer user equipment before the receiver receives the first message sent by the peer user equipment, where the third message is used to request the peer user equipment to allocate the first IP address to the user equipment.

According to a seventh aspect, an embodiment of the present invention provides user equipment, where a first IP address is pre-configured in the user equipment, a second IP address is pre-configured in peer user equipment, and the user equipment includes:

a transmitter, configured to send a first message to the peer user equipment, where the first message includes the first IP address and indication information, the indication information is used to indicate that the user equipment is to use the first IP address, the indication information is further used to indicate that the peer user equipment is to use the second IP address, and the first message is used to request the peer user equipment to establish a device-to-device (D2D) communication connection to the user equipment according to the first IP address; and a receiver, configured to receive a second message sent by the peer user equipment, where the second message is used to indicate that establishment of the D2D communication connection succeeds.

According to an eighth aspect, an embodiment of the present invention provides a user equipment, where a first IP address is pre-configured in the user equipment, a second IP address is pre-configured in a peer user equipment, and the user equipment includes:

a transmitter, configured to send a first message to the peer user equipment, where the first message includes indication information, the indication information is used to indicate that the user equipment is to use the first IP address, the indication information is further used to indicate that the peer user equipment is to use the second IP address, and the indication information is further used to indicate that the user equipment is an establisher of a device-to-device (D2D) communication connection; and a receiver, configured to receive a second message sent by the peer user equipment, where the second message includes the second IP address, so that the user equipment establishes a device-to-device (D2D) communication connection to the peer user equipment according to the second IP address.

In a first possible implementation manner of the eighth aspect, the first message further includes a packet data network (PDN) type, and the PDN type indicates a type of an IP address used by the peer user equipment; and the second IP address in the second message is added by the peer user equipment according to the indication information and the PDN type.

According to the IP address allocation method in D2D communication and the user equipment that are provided in the embodiments of the present invention, a first user equipment sends a first message that includes an allocated first IP address to a second user equipment, where the first message explicitly indicates responsibilities of the first user equipment and the second user equipment in an IP address allocation process, that is, the first user equipment is an allocator of an IP address, and the second user equipment is a receiver of an IP address, so that the second user equipment returns a second message according to the received first IP address, where the second message specifically indicates whether allocation of the first IP address succeeds or fails, that is, when the second user equipment does not support a type of the first IP address allocated by the first user equipment to the second user equipment, the second user equipment does not execute an operation of allocating an IP address. According to the method provided in the embodiments, a case, in which an IP address is repeatedly allocated or an IP address is not allocated, caused because both a sending party user equipment and peer user equipment may serve as an allocator of an IP address or serve as a receiver of an IP address in an IP address allocation process of prior-art D2D communication is resolved, and a success rate of establishing a D2D communication connection is correspondingly improved.

BRIEF DESCRIPTION OF DRAWINGS

To describe technical solutions in embodiments of the present invention more clearly, the following briefly describes the accompanying drawings. The accompanying drawings in the following description show some embodiments of the present invention, and persons of ordinary skill in the art may still derive other drawings from these accompanying drawings without creative efforts.

DESCRIPTION OF EMBODIMENTS

Figure 1:
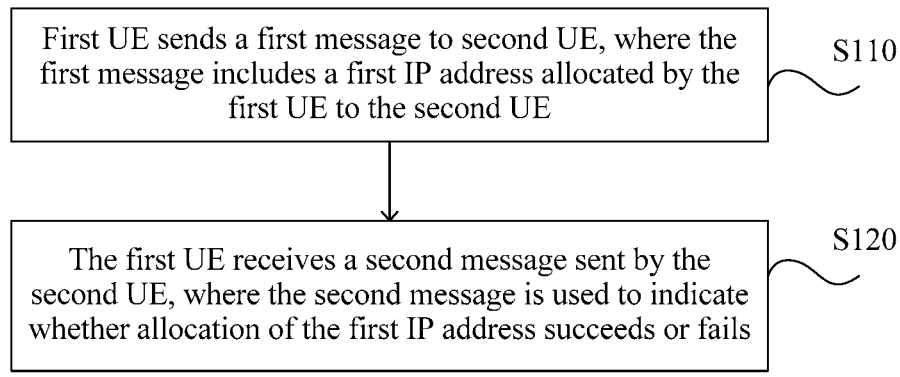
FIG. 1 is a flowchart of an IP address allocation method in D2D communication according to Embodiment 1 of the present invention.

To make objectives, technical solutions, and advantages of embodiments of the present invention clearer, the following clearly describes technical solutions in the embodiments of the present invention with reference to the accompanying drawings. The described embodiments are some but not all of the embodiments of the present invention. All other embodiments obtained by persons of ordinary skill in the art based on the embodiments of the present invention without creative efforts shall fall within the protection scope of the present invention.

To meet a requirement of an LTE network system for high-density users and a high throughput, D2D communication is generally performed between user equipments, that is, communication can be directly performed between the user equipments by reusing cell resources. A user equipment described in the following embodiments of the present invention is a user equipment that can execute D2D communication, and the user equipment may share resources with a cell user under control of a cell network. This improves utilization of spectrum resources. In addition, D2D communication further has advantages, for example, relieving a burden of a cellular network, reducing battery consumption of a mobile terminal, increasing a bit rate, and improving robustness of a network infrastructure fault, and may further support a point-to-point data service in a small range.

Currently, generally used D2D communication includes a Bluetooth, a Wireless Fidelity (Wi-Fi) direct connection, that is, Wi-Fi Direct, and the like. D2D communication described in the following embodiments of the present invention is D2D communication based on an LTE network system, and generally includes D2D communication in an LTE network (LTE-D2D) and a proximity-based service (ProSe). Both the LTE-D2D and the ProSe can be applied to user equipments that directly communicate with each other, and the user equipments can communicate with each other when there is no network infrastructure.

From a perspective of an application scenario, D2D communication includes group communication and one-to-one communication, and an IP address allocation method in D2D communication provided in the following embodiments of the present invention is applicable to one-to-one communication. Specifically, if UE 1 expects to perform D2D communication with UE 2, the UE 1 sends a communication establishment request message to the UE 2, where the request message carries a layer-2 address of the UE 2, that is, a Layer-2 address. The Layer-2 address is filled in a Medium Access Control (MAC) layer of a protocol stack as a packet header of the MAC layer. The Layer-2 address may be obtained by the UE 1 by means of D2D discovery, or may be pre-configured in the UE 1, or the like. After receiving the request message, the UE 2 may verify an identity of the UE 1. However, a user equipment that establishes D2D communication further needs to obtain an IP address of a peer user equipment to implement data transmission. In the foregoing IP address allocation manner provided in the prior art, both the UE 1 and the UE 2 may serve as an allocator of an IP address, or may serve as a receiver of an IP address. Therefore, an IP address may be repeatedly allocated or an IP address may not be allocated, resulting in a failure in establishing a D2D communication connection.

Specific embodiments are used in the following to detail the technical solutions of the present invention. In the embodiments of the present invention, an allocator that allocates an IP address and a receiver that receives an IP address may involve only two user equipments without involving a network device, such as an E-UTRAN NodeB (eNB). The following several specific embodiments may be combined with each other, and the same or similar concepts or processes may not be described repeatedly in some embodiments.

Embodiment 1

FIG. 1 is a flowchart of an IP address allocation method in D2D communication according to Embodiment 1 of the present invention. The method provided in this embodiment is applicable to a case in which two user equipments that establish D2D communication allocate an IP address. The method provided in this embodiment may be executed by a user equipment. The user equipment may be implemented in a hardware or software manner, and may be integrated into a memory of the user equipment. For example, the user equipment is integrated into a chip of a processor, for being invoked and executed by the processor. The method in this embodiment includes the following steps.

S110. A first user equipment sends a first message to a second user equipment, where the first message includes a first IP address allocated by the first user equipment to the second user equipment.

In this embodiment, the first user equipment is an initiator of D2D communication, and when initiating the D2D communication, the first user equipment may allocate, to the second user equipment, the first IP address used to establish the D2D communication. Therefore, the first user equipment knows an IP address of the first user equipment, and may know an IP address, that is, the first IP address allocated by the first user equipment, of peer UE in the D2D communication, that is, the second user equipment. In the method provided in this embodiment, as the initiator of the D2D communication, the first user equipment is an allocator of an IP address in the D2D communication. Specifically, the first IP address allocated by the first user equipment is carried in the first message that is sent to the second user equipment, and correspondingly, the second user equipment is a receiver of an IP address in the D2D communication. In specific implementation, it may be stipulated in a preset protocol that, the first user equipment and the second user equipment determine respective responsibilities in an IP address allocation process of the D2D communication by using an information element carried in the first message. In this embodiment, if the first message sent by the first user equipment includes the allocated first IP address, it may be determined that the first user equipment is an allocator of an IP address, and therefore, the second user equipment may verify an identity of the first user equipment by using the allocated first IP address and a known Layer-2 address, to implement establishment of a D2D communication connection.

It should be noted that, the first IP address allocated by the first user equipment to the second user equipment in this embodiment may be carried in a communication establishment message for initiating D2D communication, or may be sent after the first user equipment sends a communication establishment request message. For example, the first IP address is carried in an IP address allocation message for sending. That is, the first message in this embodiment may be a communication establishment request message or an IP address allocation message.

S120. The first user equipment receives a second message sent by the second user equipment, where the second message is used to indicate whether allocation of the first IP address succeeds or fails.

In this embodiment, when receiving the first message that is a request message and is sent by the first user equipment, the second user equipment obtains the first IP address allocated by the first user equipment to the second user equipment. In this case, the second user equipment may know whether the first IP address is a type, of an IP address, supported by the second user equipment. However, when allocating the first IP address, the first user equipment does not know the type, of the IP address, supported by the second user equipment, that is, a type of the first IP address is randomly allocated by the first user equipment according to a capability of the first user equipment. Therefore, when the second user equipment supports the type of the first IP address, the returned second message indicates that allocation of the first IP address succeeds; or when the second user equipment does not support the type of the first IP address, the returned second message indicates that allocation of the first IP address fails. When the second user equipment does not support the type of the first IP address, for example, the type of the first IP address allocated by the first user equipment is an IPv6 type, but the second user equipment does not support an IP address of an IPv6 type, the second user equipment cannot establish a D2D communication connection to the first user equipment by using the first IP address.

In this embodiment, when the second user equipment does not support the first IP address, as a receiver of an IP address in the D2D communication, the second user equipment does not allocate an IP address, but specifically returns, to the first user equipment, an indication message indicating that allocation of the first IP address fails, so as to indicate that the first user equipment is to perform subsequent IP address allocation work. In addition, in this case, the second message includes at least one of a second packet data network (PDN) type or a cause value, the second PDN type is used to indicate the type, of the IP address, supported by the second user equipment, and the cause value is used to indicate that the second user equipment does not support the type of the first IP address. Specifically, the second user equipment indicates an allocation situation of the first IP address to the first user equipment by adding an information element to the second message. Both the second PDN type and the cause value may indicate that allocation of the first IP address fails.

In the IP address allocation method in D2D communication provided in this embodiment, the first user equipment and the second user equipment determine respective responsibilities in a D2D communication establishment process. In one aspect, the first user equipment serves as the initiator of the D2D communication and actively executes an operation of allocating an IP address. In another aspect, even if the second user equipment knows that the first IP address allocated by the first user equipment to the second user equipment is not supported, the second user equipment does not execute the operation of allocating an IP address, but feeds back at least one of the second PDN type or the cause value to the first user equipment, to indicate the type, of the IP address, supported by the second user equipment to the first user equipment. Therefore, a case in which both the two user equipments that execute the D2D communication serve as an allocator of an IP address or serve as a receiver of an IP address does not exist, thereby avoiding a case in which an IP address is repeatedly allocated or an IP address is not allocated, and correspondingly improving a success rate of establishing a D2D communication connection.

According to the IP address allocation method in D2D communication provided in this embodiment, a first user equipment sends a first message that includes an allocated first IP address to a second user equipment, where the first message explicitly indicates responsibilities of the first user equipment and the second user equipment in an IP address allocation process, that is, the first user equipment is an allocator of an IP address, and the second user equipment is a receiver of an IP address, so that the second user equipment returns a second message according to the received first IP address, where the second message specifically indicates whether allocation of the first IP address succeeds or fails, that is, when the second user equipment does not support a type of the first IP address allocated by the first user equipment to the second user equipment, the second user equipment does not execute an operation of allocating an IP address. According to the method provided in this embodiment, a case, in which an IP address is repeatedly allocated or an IP address is not allocated, caused because both a sending party user equipment and a peer user equipment may serve as an allocator of an IP address or serve as a receiver of an IP address in an IP address allocation process of prior-art D2D communication is resolved, and a success rate of establishing a D2D communication connection is correspondingly improved.

Further, when the second message indicates that allocation of the first IP address fails, the second message specifically carries at least one of the second PDN type or the cause value, and the second PDN type specifically indicates the type, of the IP address, that can be supported by the second user equipment. If the second message includes only the cause value, although the type, of the IP address, supported by the second user equipment is not explicitly indicated, the type, of the IP address, that can be supported by the second user equipment is implicitly indicated because a type of an IP address generally includes an IPv4 type and an IPv6 type at present. In addition, considering a factor that different types of IP addresses can be compatible with the first user equipment, even if the second user equipment does not support the type of the allocated first IP address, the first user equipment may have a capability of allocating, to the second user equipment, an IP address of a type that can be supported by the second user equipment. For example, if the first user equipment supports an IPv6 address type and the second user equipment supports an IPv4 address type, the first IP address allocated by the first user equipment, that is, an address of an IPv6 type, cannot be supported by the second user equipment. However, the first user equipment may further allocate an address of an IPv4 type because of higher compatibility. Therefore, in the method provided in this embodiment, the second user equipment may further send, to an allocator of an IP address, that is, the first user equipment, an information element that is used to indicate the type, of the IP address, supported by the second user equipment, so as to indicate that the first user equipment is to reallocate a second IP address to the second user equipment, that is, the second PDN type. Therefore, the first user equipment may perform subsequent IP address allocation work according to the information element in the second message.

Figure 2:
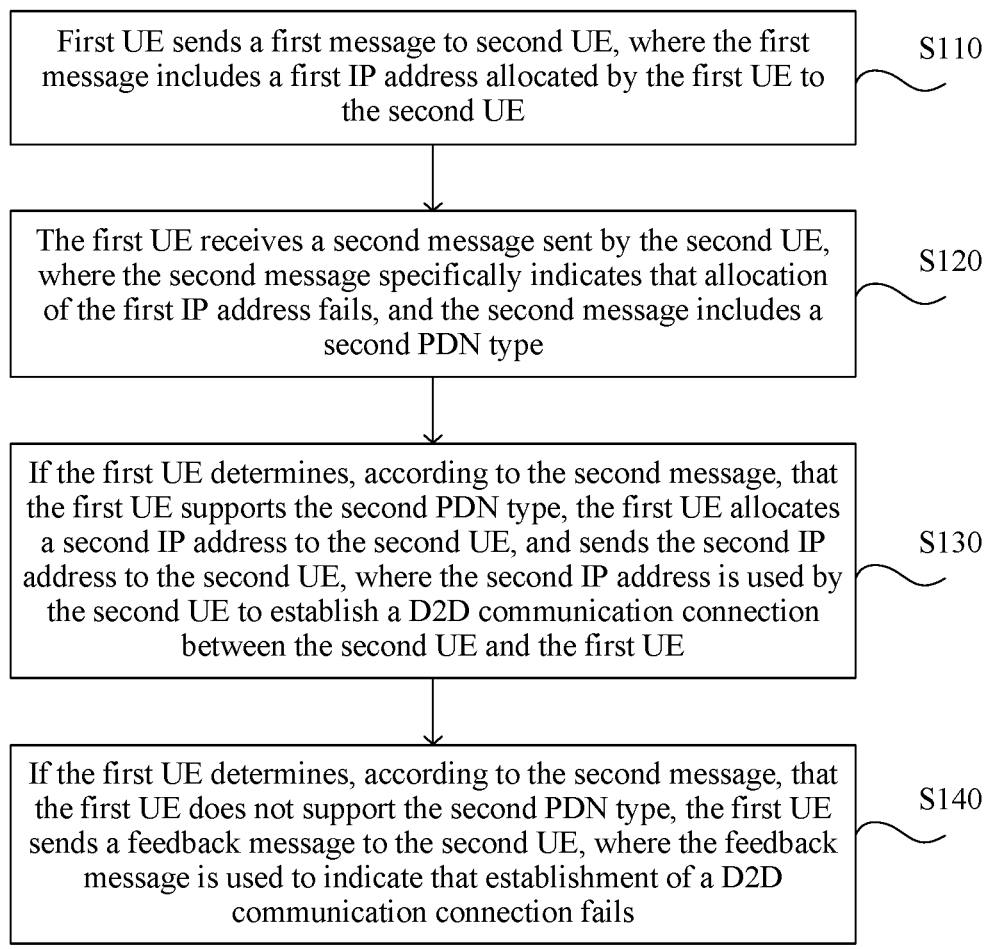
FIG. 2 is a flowchart of another IP address allocation method in D2D communication according to an embodiment of the present invention.

Optionally, FIG. 2 is a flowchart of another IP address allocation method in D2D communication according to an embodiment of the present invention. FIG. 2 is a further description based on the embodiment shown in FIG. 1. If the second message in S120 in this embodiment specifically indicates that allocation of the first IP address fails, and the second message specifically includes the second PDN type, the method in this embodiment further includes:

S130. If the first user equipment determines, according to the second message, that the first user equipment supports the second PDN type, the first user equipment allocates a second IP address to the second user equipment, and sends the second IP address to the second user equipment, where the second IP address is used by the second user equipment to establish a D2D communication connection between the second user equipment and the first user equipment.

In this embodiment, because the second user equipment does not support the type of the first IP address, the second PDN type is specifically carried in the second message that is sent by the second user equipment to the first user equipment. The first user equipment may learn, according to the second PDN type, the type, of the IP address, supported by the second user equipment, and may know whether an IP address of the second PDN type is compatible with the first user equipment. That is, when the IP address of the second PDN type can be compatible with the first user equipment, the first user equipment serves as an allocator of an IP address and may reallocate the second IP address to the second user equipment, and a type of the second IP address is a type, of an IP address, indicated by the second PDN type.

In another possible implementation manner of the embodiment shown in FIG. 2, the method further includes the following step:

S140. If the first user equipment determines, according to the second message, that the first user equipment does not support the second PDN type, the first user equipment sends a feedback message to the second user equipment, where the feedback message is used to indicate that establishment of a D2D communication connection fails.

In this embodiment, when obtaining the second PDN type returned by the second user equipment, the first user equipment determines that an IP address of the second PDN type cannot be compatible with the first user equipment, that is, the first user equipment may know that each IP address allocated by the first user equipment cannot be supported by the second user equipment, and the second user equipment cannot establish the D2D communication connection by using an IP address allocated by the first user equipment. In this case, the first user equipment sends the feedback message to the second user equipment, to indicate that establishment of the D2D communication connection fails.

It should be noted that, the foregoing S130 and S140 are two optional execution manners in the embodiment shown in FIG. 2, and either one is selected to be performed.

Figure 3:
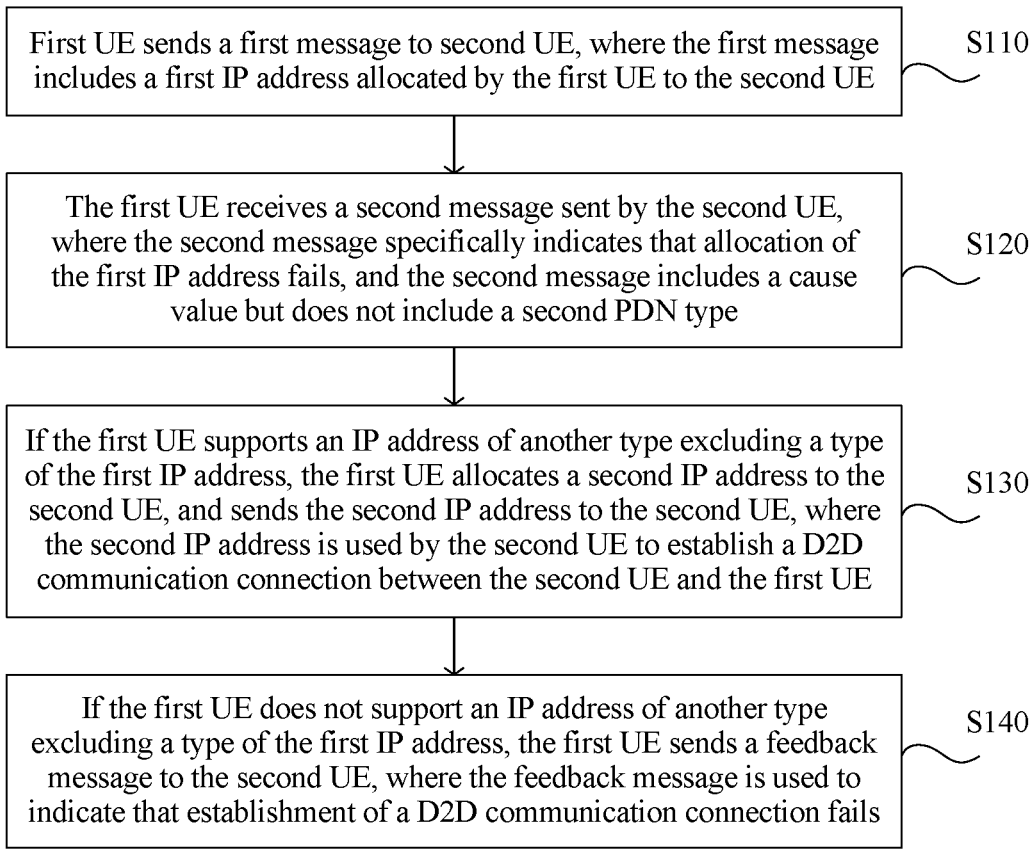
FIG. 3 is a flowchart of still another IP address allocation method in D2D communication according to an embodiment of the present invention.

Optionally, FIG. 3 is a flowchart of still another IP address allocation method in D2D communication according to an embodiment of the present invention. FIG. 3 is a further description based on the embodiment shown in FIG. 1. When the second message in S120 in this embodiment specifically indicates that allocation of the first IP address fails, and the second message specifically includes the cause value but does not include the second PDN type, the method in this embodiment further includes the following step:

S130. If the first user equipment supports an IP address of another type except a type of the first IP address, the first user equipment allocates a second IP address to the second user equipment, and sends the second IP address to the second user equipment, where the second IP address is used by the second user equipment to establish a D2D communication connection between the second user equipment and the first user equipment.

In this embodiment, because the second user equipment does not support the type of the first IP address, the cause value is specifically carried in the second message that is sent by the second user equipment to the first user equipment. Because a type of an IP address generally used for establishing a communication connection includes an IPv4 type and an IPv6 type, if the type of the first IP address allocated by the first user equipment is an IPv6 type, and the second user equipment does not support the IPv6 type, the cause value is carried in the second message for feedback, to indicate that the second user equipment does not support an address of the IPv6 type. This means that the second user equipment supports an address of the IPv4 type. In addition, if the first user equipment also supports the address of the IPv4 type, the first user equipment serves as an allocator of an IP address and may reallocate the second IP address to the second user equipment, and a type of the second IP address is an IPv4 type. In this embodiment, the first user equipment may determine, according to the cause value in the second message and the type of the allocated first IP address, the second PDN type supported by the second user equipment, so that the first user equipment allocates the second IP address to the second user equipment when the second PDN type can be compatible with the first user equipment.

In another possible implementation manner of the embodiment shown in FIG. 3, the method further includes the following step:

S140. If the first user equipment does not support an IP address of another type except a type of the first IP address, the first user equipment sends a feedback message to the second user equipment, where the feedback message is used to indicate that establishment of a D2D communication connection fails.

In this embodiment, similarly, when obtaining the cause value returned by the second user equipment, the first user equipment may determine, according to the cause value and the type of the allocated first IP address, the second PDN type supported by the second user equipment. However, when the second PDN type cannot be compatible with the first user equipment, that is, when the first user equipment may know that each IP address allocated by the first user equipment cannot be supported by the second user equipment, the first user equipment sends the feedback message to the second user equipment, to indicate that establishment of the D2D communication connection fails.

It should be noted that, the foregoing S130 and S140 are two optional execution manners in the embodiment shown in FIG. 3, and either one is selected to be performed.

Further, the first message sent by the first user equipment in the embodiment shown in FIG. 1 may further include a first PDN type, that is, when the first user equipment sends the first message, a type, of an IP address, supported by the first user equipment is indicated to the second user equipment, and when the second message specifically indicates that allocation of the first IP address fails, a processing manner of the first user equipment is different from those in the foregoing embodiments shown in FIG. 2 and FIG. 3.

Figure 4:
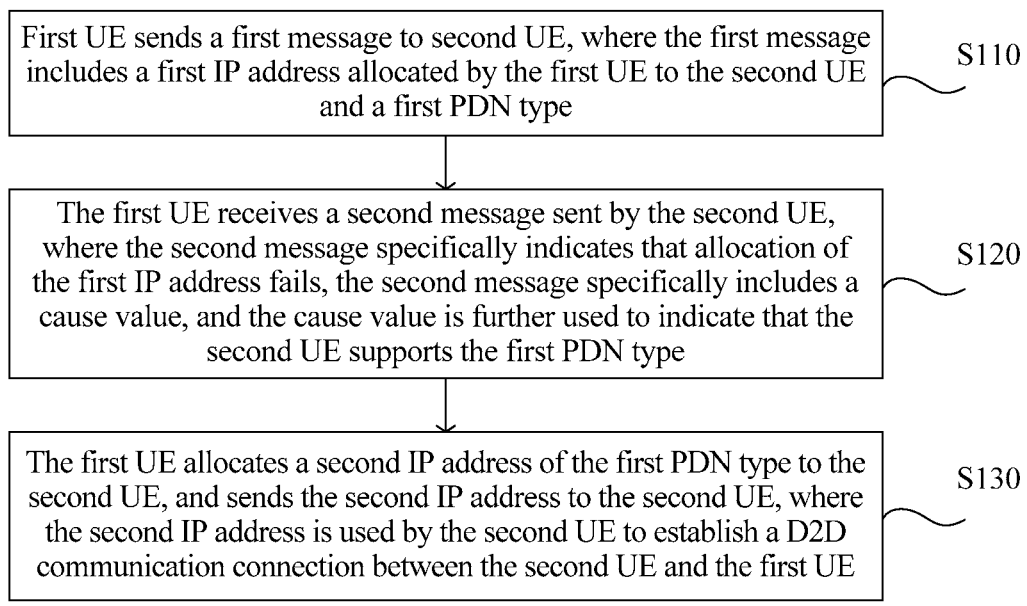
FIG. 4 is a flowchart of yet another IP address allocation method in D2D communication according to an embodiment of the present invention.

Optionally, FIG. 4 is a flowchart of yet another IP address allocation method in D2D communication according to an embodiment of the present invention. FIG. 4 is a further description based on the embodiment shown in FIG. 1. When the first message in S110 in this embodiment further includes the first PDN type, the second message in S120 specifically indicates that allocation of the first IP address fails, the second message specifically includes the cause value, and the cause value is further used to indicate that the second user equipment supports the first PDN type, the method in this embodiment further includes the following step:

S130. The first user equipment allocates a second IP address of the first PDN type to the second user equipment, and sends the second IP address to the second user equipment, where the second IP address is used by the second user equipment to establish a device-to-device (D2D) communication connection between the second user equipment and the first user equipment.

In this embodiment, the type of the first IP address allocated by the first user equipment may not be the first PDN type. For example, the first PDN type is an IPv6 type, but the first IP address allocated by the first user equipment is an IPv4 type. In addition, a second PDN type of the second user equipment is an IPv6 type, and the IPv4 type is not compatible with the second user equipment. In this case, the returned cause value indicates that the second user equipment does not support the type of the first IP address. Because the second user equipment may learn, from the received first message, that the first PDN type supported by the first user equipment is the same as the second PDN type supported by the second user equipment, the second user equipment determines that the second user equipment can support the first PDN type, and then indicates a result of the foregoing determining by using the cause value. Therefore, when the cause value is further used to indicate that the second user equipment supports the first PDN type, the first user equipment serves as an allocator of an IP address, and the first user equipment may further allocate the second IP address of the first PDN type to the second user equipment.

Figure 5:
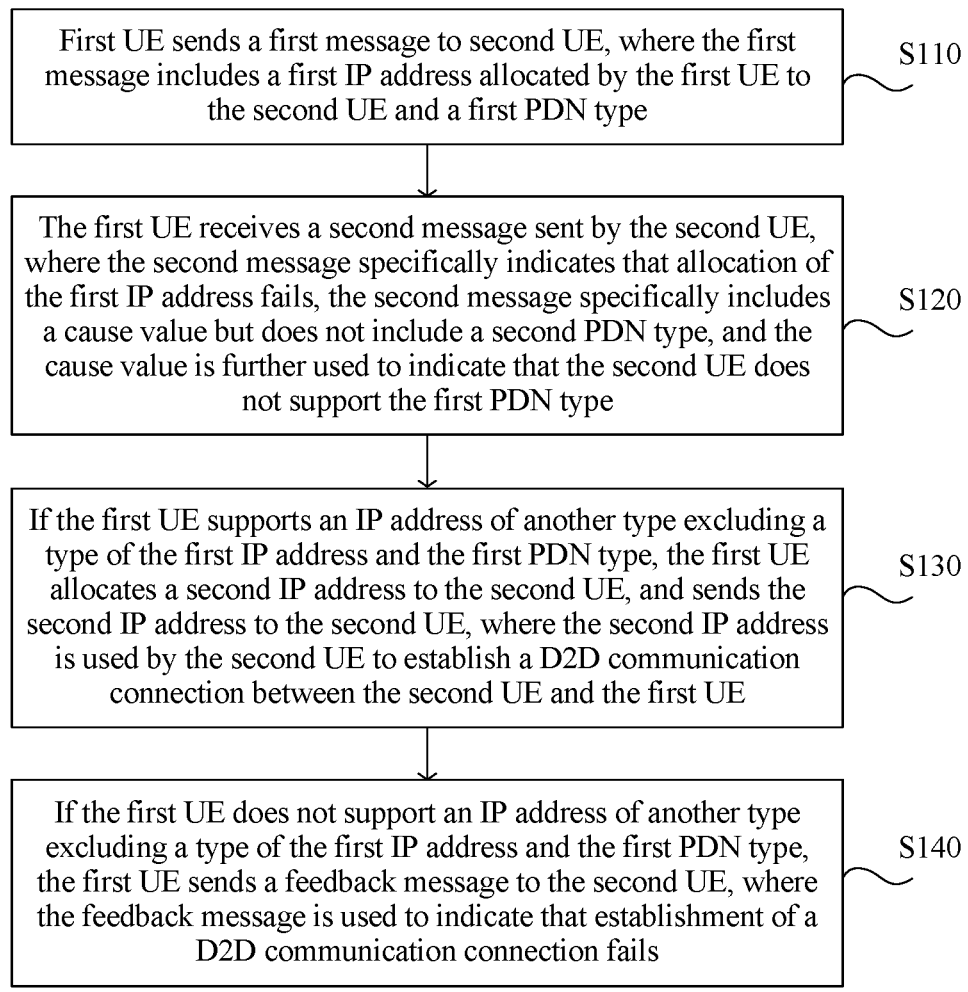
FIG. 5 is a flowchart of still yet another IP address allocation method in D2D communication according to an embodiment of the present invention.

Optionally, FIG. 5 is a flowchart of still yet another IP address allocation method in D2D communication according to an embodiment of the present invention. FIG. 5 is a further description based on the embodiment shown in FIG. 1. When the first message in S110 in this embodiment further includes the first PDN type, the second message in S120 specifically indicates that allocation of the first IP address fails, the second message specifically includes the cause value but does not include the second PDN type, and the cause value is further used to indicate that the second user equipment does not support the first PDN type, the method in this embodiment further includes the following step:

S130. If the first user equipment supports an IP address of another type except a type of the first IP address and the first PDN type, the first user equipment allocates a second IP address to the second user equipment, and sends the second IP address to the second user equipment, where the second IP address is used by the second user equipment to establish a D2D communication connection between the second user equipment and the first user equipment.

In this embodiment, for example, if both the first PDN type supported by the first user equipment and the type of the allocated first IP address are an IPv6 type, and the second user equipment supports only an IPv4 type, the second message sent by the second user equipment indicates that allocation of the first IP address fails, and the second user equipment may directly determine that the second user equipment does not support the first PDN type. In this case, considering compatibility of the first user equipment, when an IP address of the IPv4 type can be compatible with the first user equipment, the first user equipment serves as an allocator of an IP address and may allocate an IP address of another type except the first PDN type to the second user equipment, and a type of the second IP address is an IPv4 type.

In another possible implementation manner of the embodiment shown in FIG. 5, the method further includes the following step:

S140. If the first user equipment does not support an IP address of another type except a type of the first IP address and the first PDN type, the first user equipment sends a feedback message to the second user equipment, where the feedback message is used to indicate that establishment of a D2D communication connection fails.

In this embodiment, a case in S130 in the embodiment shown in FIG. 5 is used as an example for description. If both the first PDN type supported by the first user equipment and the type of the allocated first IP address are an IPv6 type, and the second user equipment supports only an IPv4 type, the second message sent by the second user equipment indicates that allocation of the first IP address fails, and the second user equipment may directly determine that the second user equipment does not support the first PDN type. In this case, when an IP address of the IPv4 type cannot be compatible with the first user equipment, that is, when the first user equipment may know that each IP address allocated by the first user equipment cannot be supported by the second user equipment, the first user equipment sends the feedback message to the second user equipment, to indicate that establishment of the D2D communication connection fails.

It should be noted that, the foregoing S130 and S140 are two optional execution manners in the embodiment shown in FIG. 5, and either one is selected to be performed.

Further, in the foregoing embodiments provided in the present invention, the first message sent by the first user equipment may further include an identity, and the identity may be, for example, an information element IP role (role) carried in the first message. When the IP role is set as a server (server), the IP role indicates that the first user equipment is an allocator of an IP address. Correspondingly, when reading the IP role from the first message, the second user equipment determines that the first user equipment is an allocator of an IP address in D2D communication, or determines, according to the IP role, that the second user equipment is a receiver of an IP address in D2D communication. In this embodiment, respective responsibilities, in an IP address allocation process, of the two user equipments that establish the D2D communication connection are explicitly specified by adding the identity. This further ensures feasibility of IP address allocation.

Furthermore, in the foregoing embodiments provided in the present invention, before S110, the method may further include: obtaining, by the first user equipment, a second PDN type of the second user equipment. The second PDN type may be obtained in a near field discovery process of the first user equipment and the second user equipment, so that the first user equipment can learn, according to the obtained second PDN type, the type, of the IP address, supported by the second user equipment, and allocate the first IP address to the second user equipment when the second PDN type can be compatible with the first user equipment, and the type of the first IP address is the second PDN type.

It should be noted that, the first user equipment in the foregoing embodiments of the present invention serves as an initiator of D2D communication and is responsible for allocating an IP address. In addition, the initiator of the D2D communication may also serve as a receiver of an IP address in the D2D communication. For example, a specific implementation manner is as follows: In the foregoing embodiments of the present invention, before S110, the method may further include: receiving, by the first user equipment, a third message sent by the second user equipment; and allocating, by the first user equipment, the first IP address to the second user equipment according to the third message. In this embodiment, the second user equipment is specifically an initiator of D2D communication, and the initiator of the D2D communication actually serves as a receiver of an IP address in the D2D communication.

Embodiment 2

Figure 6:
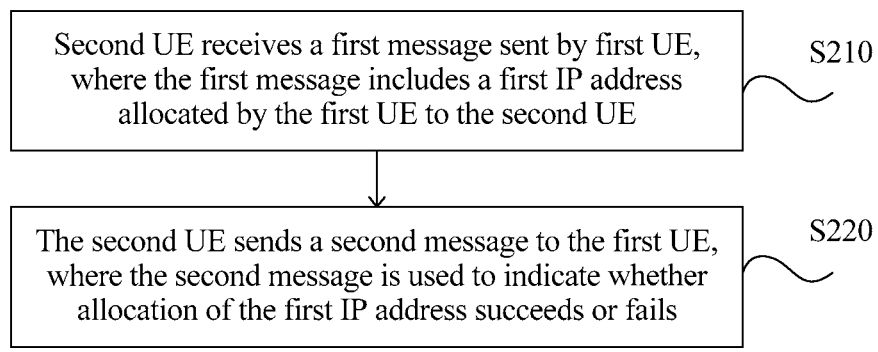
FIG. 6 is a flowchart of an IP address allocation method in D2D communication according to Embodiment 2 of the present invention.

FIG. 6 is a flowchart of an IP address allocation method in D2D communication according to Embodiment 2 of the present invention. The method provided in this embodiment is applicable to a case in which two user equipments that establish D2D communication allocate an IP address. The method provided in this embodiment may be executed by a user equipment. The user equipment may be implemented in a hardware and software manner, and may be integrated into a memory of the user equipment. For example, the user equipment is integrated into a chip of a processor, for being invoked and executed by the processor. The method in this embodiment includes the following steps.

S210. A second user equipment receives a first message sent by a first user equipment, where the first message includes a first IP address allocated by the first user equipment to the second user equipment.

The same as the foregoing embodiments shown in FIG. 1 to FIG. 5, the second user equipment in this embodiment is a receiver of an IP address in D2D communication. When receiving the first message sent by the first user equipment, the second user equipment receives the first IP address allocated by the first user equipment to the second user equipment, so that an initiator of the D2D communication is explicitly known, that is, the first user equipment is specifically an allocator of an IP address in the D2D communication. In specific implementation, it may be stipulated in a preset protocol that, the first user equipment and the second user equipment determine respective responsibilities in an IP address allocation process of the D2D communication by using an allocated IP address carried in the first message. In this embodiment, if the first message sent by the first user equipment includes the allocated first IP address, it may be determined that the first user equipment is an allocator of an IP address, and therefore, the second user equipment may verify an identity of the first user equipment by using the allocated first IP address and a known Layer-2 address, to implement establishment of a D2D communication connection.

It should be noted that, the first IP address that is allocated by the first user equipment and received by the second user equipment in this embodiment may be carried in a communication establishment message for initiating D2D communication, or may be sent after the first user equipment sends a communication establishment message. For example, the first IP address is carried in an IP address allocation message for sending. That is, the first message in this embodiment may be a communication establishment message or an IP address allocation message.

S220. The second user equipment sends a second message to the first user equipment, where the second message is used to indicate whether allocation of the first IP address succeeds or fails.

In this embodiment, the second user equipment obtains the first IP address allocated by the first user equipment to the second user equipment, and the second user equipment may know whether the first IP address is a type, of an IP address, supported by the second user equipment. However, when allocating the first IP address, the first user equipment does not know the type, of the IP address, supported by the second user equipment, that is, a type of the first IP address is randomly allocated by the first user equipment according to a capability of the first user equipment. Therefore, when the second user equipment supports the type of the first IP address, the returned second message indicates that allocation of the first IP address succeeds; or when the second user equipment does not support the type of the first IP address, the returned second message indicates that allocation of the first IP address fails. When the second user equipment does not support the type of the first IP address, for example, the type of the first IP address allocated by the first user equipment is an IPv6 type, but the second user equipment does not support an IP address of an IPv6 type, the second user equipment cannot establish a D2D communication connection to the first user equipment by using the first IP address.

In the method provided in this embodiment, the first message received by the second user equipment carries the allocated first IP address, that is, the two user equipments that establish the D2D communication determine that the first user equipment is an allocator of an IP address in the D2D communication. Therefore, even if the second user equipment does not support the allocated first IP address, the second user equipment does not execute an operation of allocating an IP address, but returns, to the first user equipment, an indication message indicating that allocation of the first IP address fails, so as to indicate that the first user equipment is to perform subsequent IP address allocation work. In addition, in this case, the second message includes at least one of a second PDN type or a cause value, and the second user equipment indicates an allocation situation of the first IP address to the first user equipment by adding an information element to the second message. Both the second PDN type and the cause value may indicate that allocation of the first IP address fails.

In this embodiment, the first user equipment and the second user equipment determine respective responsibilities in a D2D communication establishment process. In one aspect, the first user equipment serves as the initiator of the D2D communication and actively executes an operation of allocating an IP address. In another aspect, even if the second user equipment knows that the first IP address allocated by the first user equipment to the second user equipment is not supported, the second user equipment does not execute the operation of allocating an IP address, but feeds back the second PDN type to the first user equipment, to indicate the type, of the IP address, supported by the second user equipment to the first user equipment. Therefore, a case in which both the two user equipments that execute the D2D communication serve as an allocator of an IP address or serve as a receiver of an IP address does not exist, thereby avoiding a case in which an IP address is repeatedly allocated or an IP address is not allocated, and correspondingly improving reliability of establishing a D2D communication connection.

According to the IP address allocation method in D2D communication provided in this embodiment, a second user equipment receives a first message that is sent by a first user equipment and includes an allocated first IP address, to explicitly learn responsibilities of the first user equipment and the second user equipment in an IP address allocation process, that is, the first user equipment is an allocator of an IP address, and the second user equipment is a receiver of an IP address, so that the second user equipment returns a second message according to the received first IP address, where the second message is used to indicate whether allocation of the first IP address succeeds or fails, that is, when the second user equipment does not support a type of the first IP address allocated by the first user equipment to the second user equipment, the second user equipment does not execute an operation of allocating an IP address. According to the method provided in this embodiment, a case, in which an IP address is repeatedly allocated or an IP address is not allocated, caused because both a sending party user equipment and peer user equipment may serve as an allocator of an IP address or serve as a receiver of an IP address in an IP address allocation process of prior-art D2D communication is resolved, and a success rate of establishing a D2D communication connection is correspondingly improved.

Figure 7:
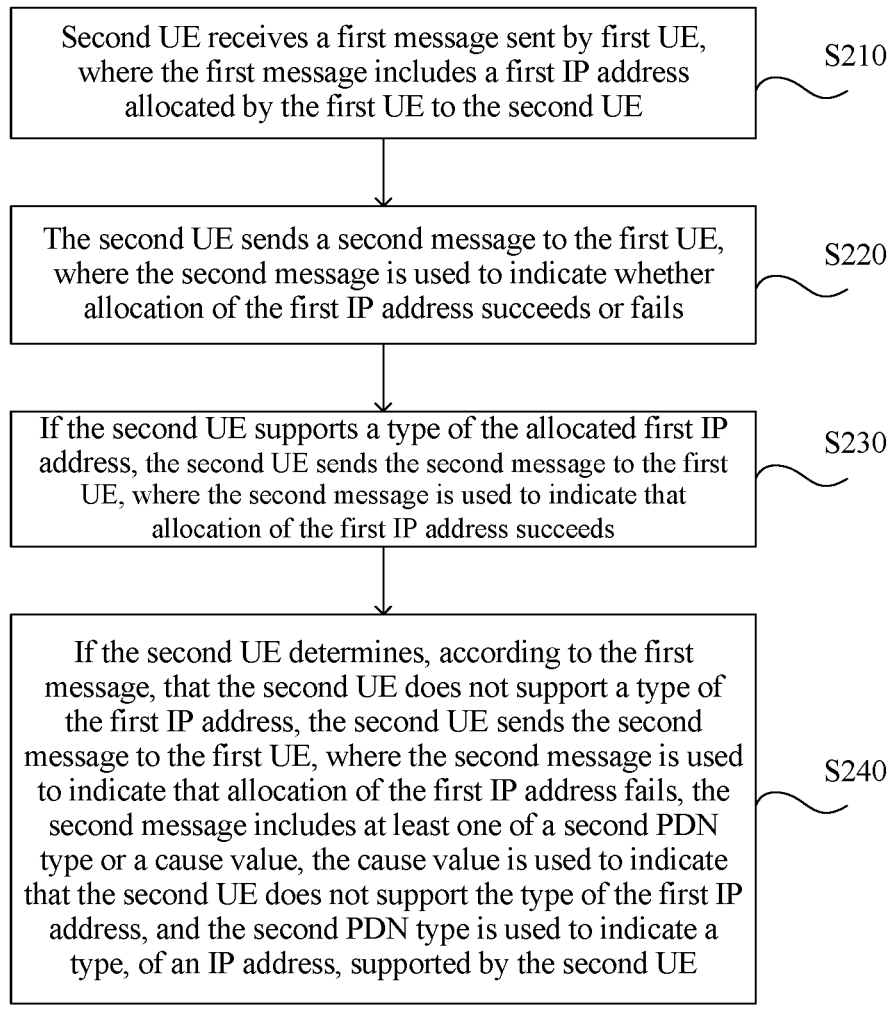
FIG. 7 is a flowchart of another IP address allocation method in D2D communication according to an embodiment of the present invention.

In specific implementation of the foregoing embodiment of the present invention, the second user equipment determines indication information in the returned second message according to the type of the received first IP address and a first PDN type that may be carried in the first message. FIG. 7 is a flowchart of another IP address allocation method in D2D communication according to an embodiment of the present invention, and FIG. 7 is a further description based on the embodiment shown in FIG. 6. Optionally, the method provided in this embodiment further includes the following step: S230. If the second user equipment supports a type of the allocated first IP address, the second user equipment sends the second message to the first user equipment, where the second message is used to indicate that allocation of the first IP address succeeds.

In another possible implementation manner of this embodiment, the method further includes the following step: S240. If the second user equipment determines, according to the first message, that the second user equipment does not support a type of the first IP address, the second user equipment sends the second message to the first user equipment, where the second message is used to indicate that allocation of the first IP address fails, the second message includes at least one of a second PDN type or a cause value, the cause value is used to indicate that the second user equipment does not support the type of the first IP address, and the second PDN type is used to indicate a type, of an IP address, supported by the second user equipment. In this embodiment, the second user equipment directly determines, according to the type of the first IP address and a capability of the second user equipment, whether the type of the first IP address is supported. In this case, the first user equipment may determine, according to compatibility of the first user equipment, whether the first user equipment may continue to allocate a second IP address to the second user equipment. Specifically, if the first user equipment can support the second PDN type, a second IP address of the second PDN type may be allocated to the second user equipment; or if the first user equipment cannot support the second PDN type, a feedback message is sent to indicate that establishment of a D2D communication connection fails.

It should be noted that, the foregoing S230 and S240 are two optional execution manners in the embodiment shown in FIG. 7, and either one is selected to be performed.

Figure 8:
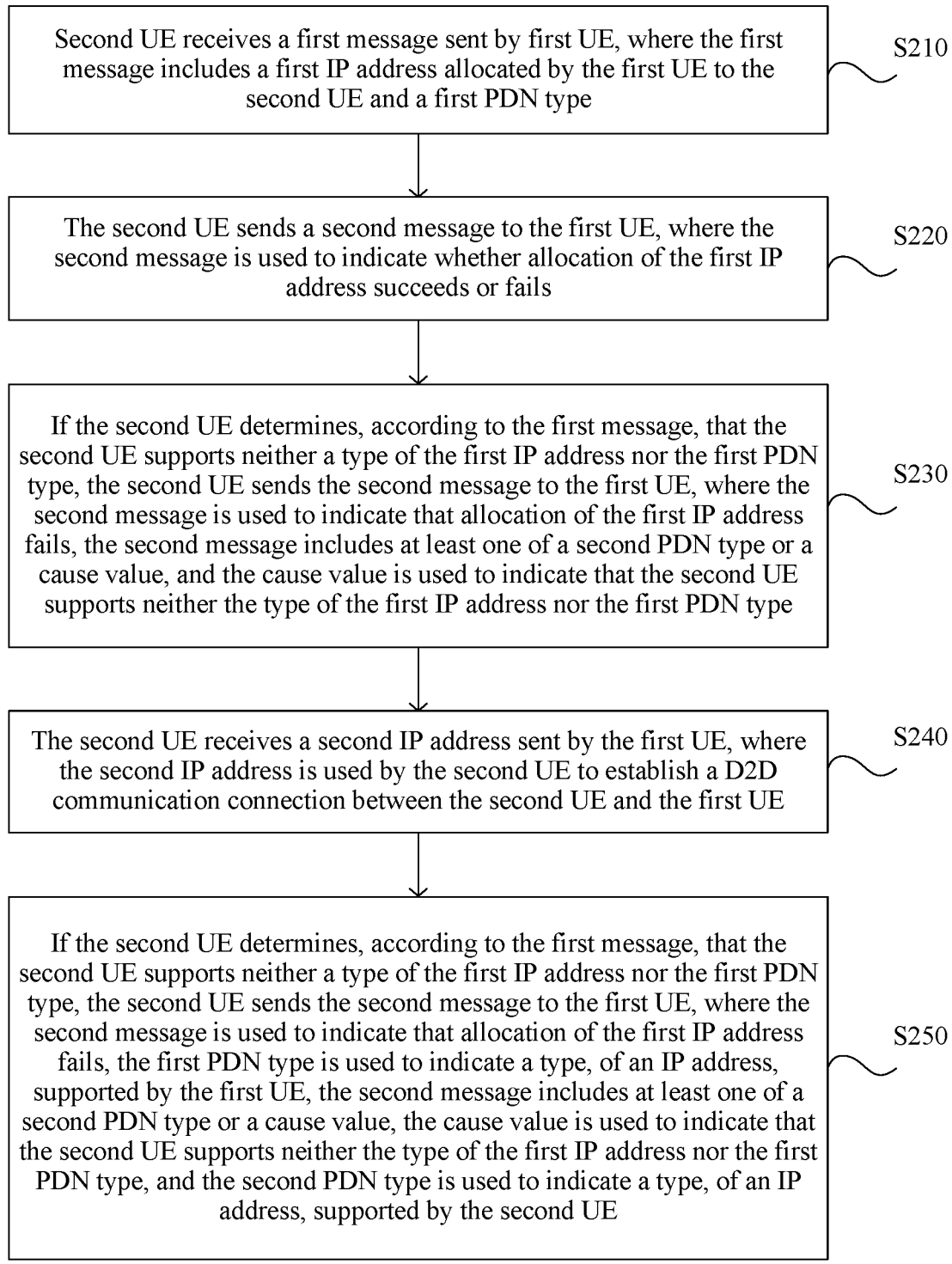
FIG. 8 is a flowchart of still another IP address allocation method in D2D communication according to an embodiment of the present invention.

Further, FIG. 8 is a flowchart of still another IP address allocation method in D2D communication according to an embodiment of the present invention, and FIG. 8 is a further description based on the embodiment shown in FIG. 6. In this embodiment, if the first message further includes a first PDN type, the method provided in this embodiment further includes the following step: S230. If the second user equipment determines, according to the first message, that the second user equipment does not support a type of the first IP address but the second user equipment supports the first PDN type, the second user equipment sends the second message to the first user equipment, where the second message is used to indicate that allocation of the first IP address fails, the second message includes at least one of a second PDN type or a cause value, and the cause value is used to indicate that the second user equipment does not support the type of the first IP address but the second user equipment supports the first PDN type. In this embodiment, considering a factor that different types of IP addresses can be compatible with the first user equipment, even if the second user equipment does not support the type of the allocated first IP address, the first user equipment may have a capability of allocating, to the second user equipment, an IP address of a type that can be supported by the second user equipment. For example, the first user equipment supports an IPv6 type, and an IPv4 type is compatible with the first user equipment; and the second user equipment supports the IPv6 type, but the IPv4 type is not compatible with the second user equipment. If the first IP address allocated by the first user equipment is an IPv4 type, the first IP address cannot be supported by the second user equipment. However, if the second user equipment learns, by using the first message, that the second user equipment can support the first PDN type, the sent second message is used to indicate that the first user equipment is to allocate a second IP address whose type is the same as the first PDN type. The method provided in this embodiment further includes the following step: S240. The second user equipment receives a second IP address sent by the first user equipment, where the second IP address is used by the second user equipment to establish a D2D communication connection between the second user equipment and the first user equipment.

In another possible implementation manner of this embodiment, the method further includes the following step: S250. If the second user equipment determines, according to the first message, that the second user equipment does not support a type of the first IP address and the second user equipment does not support the first PDN type, the second user equipment sends the second message to the first user equipment, where the second message is used to indicate that allocation of the first IP address fails, the first PDN type is used to indicate a type, of an IP address, supported by the first user equipment, the second message includes at least one of a second PDN type or a cause value, the cause value is used to indicate that the second user equipment does not support the type of the first IP address and the second user equipment does not support the first PDN type, and the second PDN type is used to indicate a type, of an IP address, supported by the second user equipment. In this embodiment, similarly, compatibility of the first user equipment is considered. After determining that the type of the first IP address is not supported, the second user equipment further determines whether the first PDN type is supported. For example, the type of the first IP address is an IPv6 type, the first PDN type is also an IPv6 type, and the second user equipment can support only an IP address of an IPv4 type. Therefore, when the second message is sent, that the second user equipment supports neither the type of the first IP address nor the first PDN type may be indicated in the cause value. In this case, the first user equipment may determine, according to the compatibility of the first user equipment, whether the first user equipment may continue to allocate a second IP address to the second user equipment. Specifically, if the second PDN type can be compatible with the first user equipment, a second IP address of the second PDN type may be allocated to the second user equipment; or if the second PDN type cannot be compatible with the first user equipment, a feedback message is sent to indicate that establishment of a D2D communication connection fails.

It should be noted that, the foregoing S230 to S240 and S250 are two optional execution manners in the embodiment shown in FIG. 8, and either one is selected to be performed.

Further, in the foregoing embodiments provided in the present invention, the first message sent by the first user equipment may further include an identity, and the identity may be, for example, an information element IP role carried in the first message. If the IP role may be set as a server, the method provided in this embodiment further includes: determining, by the second user equipment according to the identity, that the first user equipment is an allocator of an IP address in D2D communication or that the second user equipment is a receiver of an IP address in D2D communication. In this embodiment, respective responsibilities, in an IP address allocation process, of the two user equipments that establish the D2D communication connection are explicitly specified by adding the identity. This further ensures feasibility of IP address allocation.

It should be noted that, the second user equipment in the foregoing embodiments of the present invention serves as a receiver of an IP address in D2D communication, and the first user equipment serves as an initiator of the D2D communication and is responsible for allocating an IP address. Similarly, the initiator of the D2D communication may also serve as a receiver of an IP address in the D2D communication. For example, a specific implementation manner is as follows: In the foregoing embodiments of the present invention, before S210, the method may further include: sending, by the second user equipment, a third message to the first user equipment, where the third message is used to request the first user equipment to allocate the first IP address to the second user equipment. In this embodiment, the second user equipment is specifically an initiator of D2D communication, and the initiator of the D2D communication actually serves as a receiver of an IP address in the D2D communication.

Embodiment 3

Figure 9:
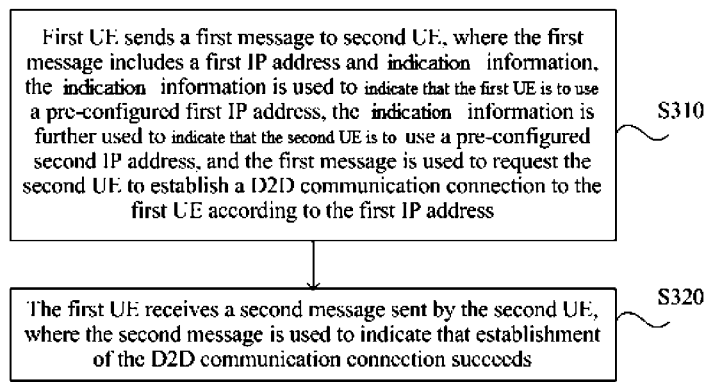
FIG. 9 is a flowchart of an IP address allocation method in D2D communication according to Embodiment 3 of the present invention.

FIG. 9 is a flowchart of an IP address allocation method in D2D communication according to Embodiment 3 of the present invention. The method provided in this embodiment is applicable to a case in which two user equipments that establish D2D communication obtain an IP address. The method provided in this embodiment may be executed by a user equipment. The user equipment may be implemented in a hardware and software manner, and may be integrated into a memory of the user equipment. For example, the user equipment is integrated into a chip of a processor, for being invoked and executed by the processor. The method in this embodiment includes the following steps.

S310. A first user equipment sends a first message to a second user equipment, where the first message includes a first IP address and indication information, the indication information is used to indicate that the first user equipment is to use a pre-configured first IP address, the indication information is further used to indicate that the second user equipment is to use a pre-configured second IP address, and the first message is used to request the second user equipment to establish a D2D communication connection to the first user equipment according to the first IP address.

In this embodiment, the first IP address is pre-configured in the first user equipment, and the second IP address is pre-configured in the second user equipment. For example, the first user equipment and the second user equipment have performed group communication before D2D communication, and the first user equipment and the second user equipment each have configured IP addresses. In this case, if the first user equipment and the second user equipment need to perform the D2D communication, the configured IP addresses used in the group communication may be directly used without a need to allocate an IP address. Specifically, the first user equipment serves as an initiator of the D2D communication, and when initiating the D2D communication, the first user equipment adds the configured first IP address of the first user equipment and the indication information to the first message. For example, when the indication information is set to be pre-configured, the indication information indicates that the first user equipment is to use the first IP address and indicates that the second user equipment is to use the second IP address. The second user equipment may establish the D2D communication connection between the second user equipment and the first user equipment according to the indication information and the first IP address.

It should be noted that, the first user equipment in this embodiment indicates, by using the first message, the second user equipment to establish the D2D communication connection by using the first IP address carried in the first message. The first IP address may be carried in a communication establishment message for initiating D2D communication, or may be sent after the first user equipment sends a communication establishment message. For example, the first IP address is carried in an IP address sending message for sending. That is, the first message in this embodiment may be a communication establishment message or an IP address sending message.

S320. The first user equipment receives a second message sent by the second user equipment, where the second message is used to indicate that establishment of the D2D communication connection succeeds.

In this embodiment, when receiving the first message sent by the first user equipment, the second user equipment obtains the first IP address from the first message. Because the first user equipment and the second user equipment previously have performed the group communication, the second user equipment can support the first IP address, and may establish the D2D communication connection to the first user equipment by using the first IP address. Therefore, the second message used to indicate that establishment of the connection succeeds is returned to the first user equipment.

In this embodiment, the first user equipment and the second user equipment determine respective responsibilities in a D2D communication establishment process. In one aspect, the first user equipment serves as the initiator of the D2D communication, and adds the first IP address and the indication information to the first message sent by the first user equipment, to indicate that the first user equipment and the second user equipment are to use the respective configured IP addresses. In another aspect, that the first message sent by the first user equipment carries the first IP address further indicates that the second user equipment is an establisher of the D2D communication connection. Therefore, for two user equipments that execute D2D communication, a specified user equipment obtains a configured IP address of a peer user equipment, and establishes D2D communication by using the IP address obtained from the peer user equipment and a configured IP address of the specified user equipment. Obviously, a case in which both the two user equipments serve as an allocator of an IP address or serve as a receiver of an IP address does not exist, thereby avoiding a case in which an IP address is repeatedly allocated or an IP address is not allocated, and correspondingly improving a success rate of establishing a D2D communication connection.

According to the IP address allocation method in D2D communication provided in this embodiment, a first user equipment sends a first message that includes a first IP address and indication information to a second user equipment, where the indication information is used to indicate that the first user equipment is to use a pre-configured first IP address and indicate that the second user equipment is to use a pre-configured second IP address, so that the second user equipment establishes a D2D communication connection to the first user equipment by using the first message and the first IP address carried in the first message. In the method provided in this embodiment, the first message explicitly indicates IP addresses used by the first user equipment and the second user equipment in D2D communication and responsibilities of the first user equipment and the second user equipment for establishing the D2D communication, thereby resolving a case, in which an IP address is repeatedly allocated or an IP address is not allocated, caused because both a sending party user equipment and peer user equipment may serve as an allocator of an IP address or serve as a receiver of an IP address in an IP address allocation process of prior-art D2D communication, and correspondingly improving a success rate of establishing a D2D communication connection.

Embodiment 4

Figure 10:
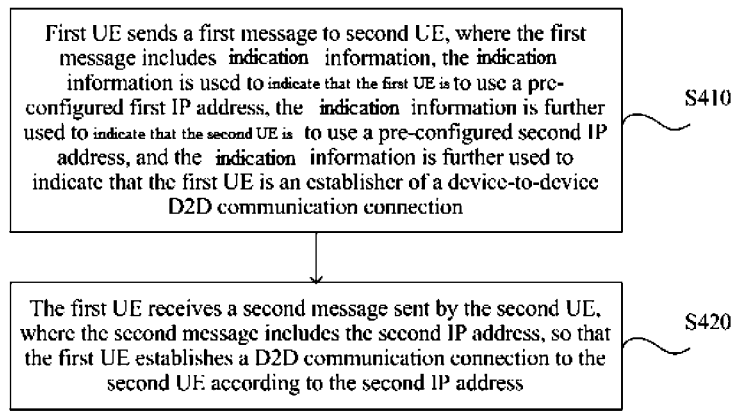
FIG. 10 is a flowchart of an IP address allocation method in D2D communication according to Embodiment 4 of the present invention.

FIG. 10 is a flowchart of an IP address allocation method in D2D communication according to Embodiment 4 of the present invention. The method provided in this embodiment is applicable to a case in which two user equipments that establish D2D communication obtain an IP address. The method provided in this embodiment may be executed by a user equipment. The user equipment may be implemented in a hardware and software manner, and may be integrated into a memory of the user equipment. For example, the user equipment is integrated into a chip of a processor, for being invoked and executed by the processor. The method in this embodiment includes the following steps.

S410. A first user equipment sends a first message to a second user equipment, where the first message includes indication information, the indication information is used to indicate that the first user equipment is to use a pre-configured first IP address, the indication information is further used to indicate that the second user equipment is to use a pre-configured second IP address, and the indication information is further used to indicate that the first user equipment is an establisher of a device-to-device (D2D) communication connection.

Similar to the foregoing embodiment shown in FIG. 9, in this embodiment, the first IP address is pre-configured in the first user equipment, and the second IP address is pre-configured in the second user equipment. For example, the first user equipment and the second user equipment have performed group communication before D2D communication, and the first user equipment and the second user equipment each have configured IP addresses. In this case, if the first user equipment and the second user equipment need to perform the D2D communication, the configured IP addresses used in the group communication may be directly used without a need to allocate an IP address. Specifically, the first user equipment serves as an initiator of the D2D communication. For example, when the first user equipment initiates the D2D communication, the indication information is set to be pre-configured to indicate that the first user equipment is to use the first IP address and indicate that the second user equipment is to use the second IP address, and the indication information is further used to indicate that the first user equipment is the establisher of the D2D communication connection. That is, when the first user equipment needs to obtain an IP address of a peer user equipment in D2D communication, the second user equipment is notified to send the pre-configured second IP address of the second user equipment to the first user equipment.

S420. The first user equipment receives a second message sent by the second user equipment, where the second message includes the second IP address, so that the first user equipment establishes a D2D communication connection to the second user equipment according to the second IP address.

In this embodiment, when receiving the first message sent by the first user equipment, the second user equipment may know, by using content of the indication information, that the first user equipment establishes the D2D communication connection. Therefore, the second user equipment adds the pre-configured second IP address of the second user equipment to the second message and sends the second message to the first user equipment, so that the first user equipment establishes a direct D2D communication connection to the second user equipment by using the second IP address and the pre-configured first IP address of the first user equipment after obtaining the second IP address.

It should be noted that, the second user equipment in this embodiment sends the pre-configured second IP address of the second user equipment to the first user equipment by using the received first message that includes the indication information, to establish the D2D communication connection. The indication information may be carried in a communication establishment message for initiating D2D communication, or may be sent after the first user equipment sends a communication establishment message. For example, the indication information is carried in an IP address sending message for sending. That is, the first message in this embodiment may be a communication establishment message or an IP address sending message.

Further, in the method provided in this embodiment, the first message may further include a PDN type, the PDN type is specifically a PDN type supported by the first user equipment, and the PDN type indicates a type of an IP address used by the second user equipment. The second IP address in the second message is added by the second user equipment according to the indication information and the PDN type. In this embodiment, multiple IP addresses may be pre-configured in both the first user equipment and the second user equipment, and the multiple pre-configured IP addresses may be IP addresses of different types. Therefore, when initiating a D2D communication request to the second user equipment, the first user equipment adds a PDN type that can be compatible with the first user equipment to the first message, to indicate that the second user equipment is to send the second IP address whose type is the same as the PDN type to the first user equipment when returning the second message to the first user equipment.

In this embodiment, the first user equipment and the second user equipment determine respective responsibilities in a D2D communication establishment process. In one aspect, the first user equipment serves as the initiator of the D2D communication, and adds the first IP address and the indication information to the first message sent by the first user equipment, to indicate that the first user equipment and the second user equipment are to use the respective configured IP addresses. In another aspect, the indication information in the first message further indicates that the first user equipment is the establisher of the D2D communication connection. Therefore, for two user equipments that execute D2D communication, a specified user equipment obtains a configured IP address of a peer user equipment, and establishes D2D communication by using the IP address obtained from the peer user equipment and a configured IP address of the specified user equipment. Obviously, a case in which both the two user equipments serve as an allocator of an IP address or serve as a receiver of an IP address does not exist, thereby avoiding a case in which an IP address is repeatedly allocated or an IP address is not allocated, and correspondingly improving a success rate of establishing a D2D communication connection.

According to the IP address allocation method in D2D communication provided in this embodiment, second user equipment receives a first message that is sent by first user equipment and includes indication information, where the indication information is used to indicate that the first user equipment is to use a pre-configured first IP address, indicate that the second user equipment is to use a pre-configured second IP address, and indicate that the first user equipment is an establisher of a D2D communication connection, so that the second user equipment sends the pre-configured second IP address of the second user equipment to the first user equipment, and the first user equipment establishes a D2D communication connection to the second user equipment according to the second IP address. In the method provided in this embodiment, the first message explicitly indicates IP addresses used by the first user equipment and the second user equipment in D2D communication and responsibilities of the first user equipment and the second user equipment for establishing the D2D communication, thereby resolving a case, in which an IP address is repeatedly allocated or an IP address is not allocated, caused because both a sending party user equipment and a peer user equipment may serve as an allocator of an IP address or serve as a receiver of an IP address in an IP address allocation process of prior-art D2D communication, and correspondingly improving a success rate of establishing a D2D communication connection.

It should be noted that, the embodiments provided in the present invention are applicable to user equipments that directly perform D2D communication, and a message does not need to be forwarded by using a network device. Therefore, even in an application scenario without network coverage, for example, when an infrastructure is damaged due to earthquake or tsunami, an IP address cannot be allocated, by using a network device, to a user equipment that is to perform D2D communication. In the methods provided in the embodiments of the present invention, it can be ensured that an IP address is successfully allocated in D2D communication.

Figure 11:
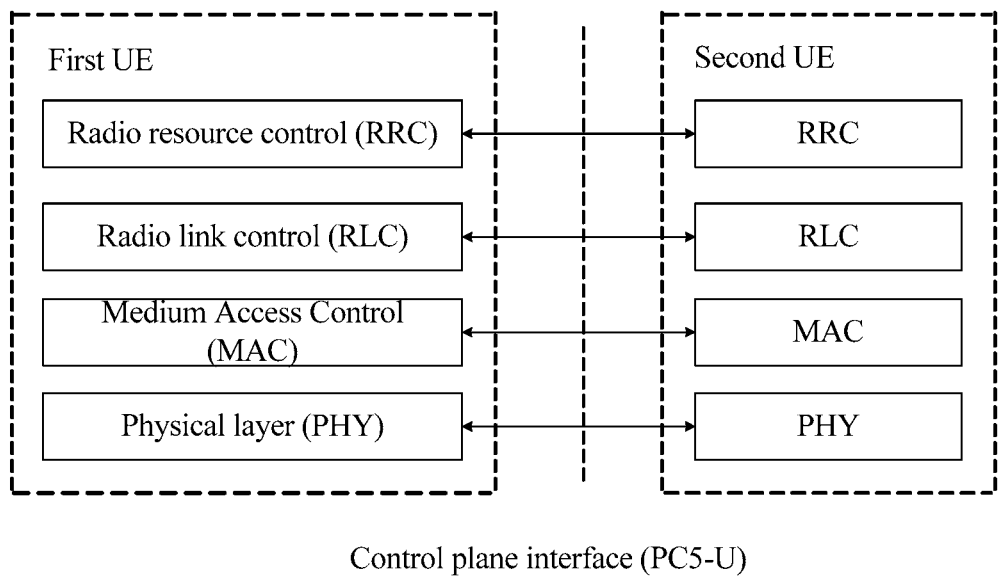
FIG. 11 is a schematic diagram of a control plane protocol stack between user equipments in D2D communication according to an embodiment of the present invention.

In specific implementation of the foregoing embodiments of the present invention, a protocol stack for communication between two user equipments that establish a D2D communication connection, that is, a first user equipment and a second user equipment, is divided into a control plane and a user plane, and the protocol stack is similar to a protocol stack of a Transmission Control Protocol/Internet Protocol (TCP/IP). A function of the control plane is signaling interaction, such as requesting, authentication, and allocation of a communication parameter, performed during connection establishment, and a function of the user plane is actual data receiving and sending. A first message, a second message, a third message, and a feedback message in the foregoing embodiments of the present invention are sent by using a control plane protocol stack between two user equipments. As shown in FIG. 11, FIG. 11 is a schematic diagram of a control plane protocol stack between user equipments in D2D communication according to an embodiment of the present invention. A control plane protocol stack between a first user equipment and a second user equipment includes the radio resource control (RRC) layer protocol, the radio link control (RLC) layer protocol, the MAC layer protocol, and the physical layer (PHY) protocol, where PC5-U (a control plane protocol of a control plane) represents a control plane interface between the two user equipments. To implement user-plane data sending, two parties of D2D communication need to establish a user-layer connection, that is, the connection is established by using an IP address. In the foregoing embodiment of the present invention, an IP address is obtained for implementing data sending in D2D communication.

Embodiment 5

Figure 12A:
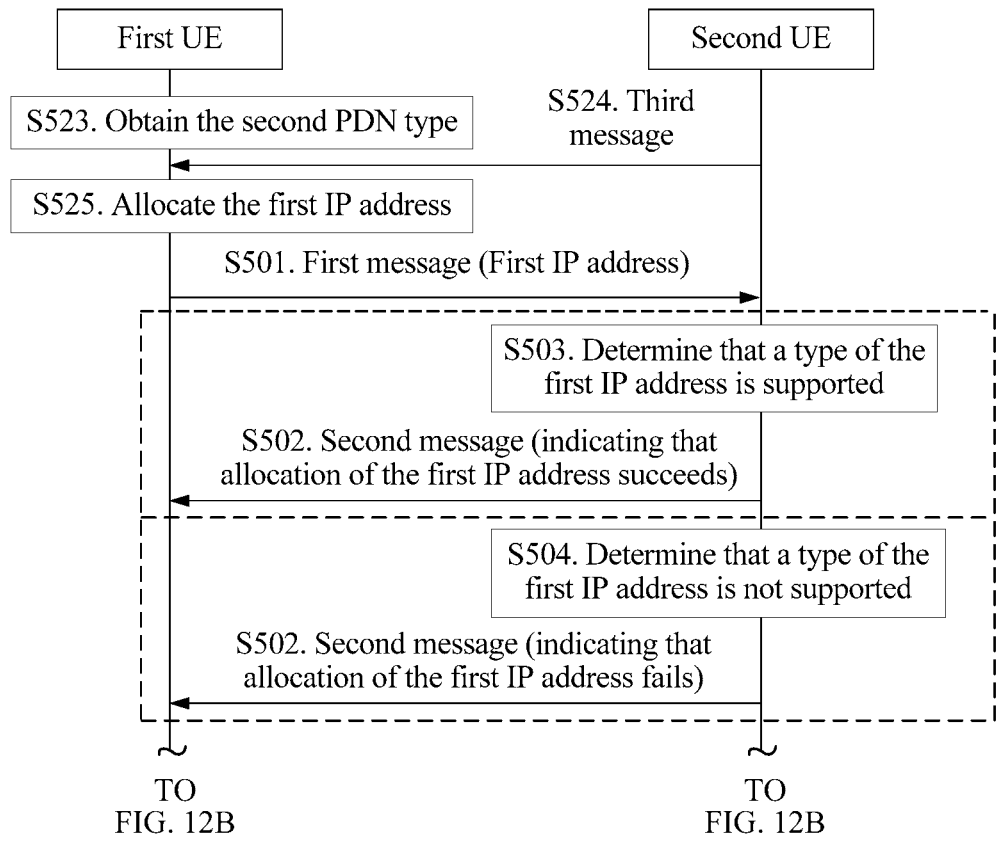
FIG. 12A and FIG. 12B are a flowchart of an IP address allocation method in D2D communication according to Embodiment 5 of the present invention.
Figure 12B:
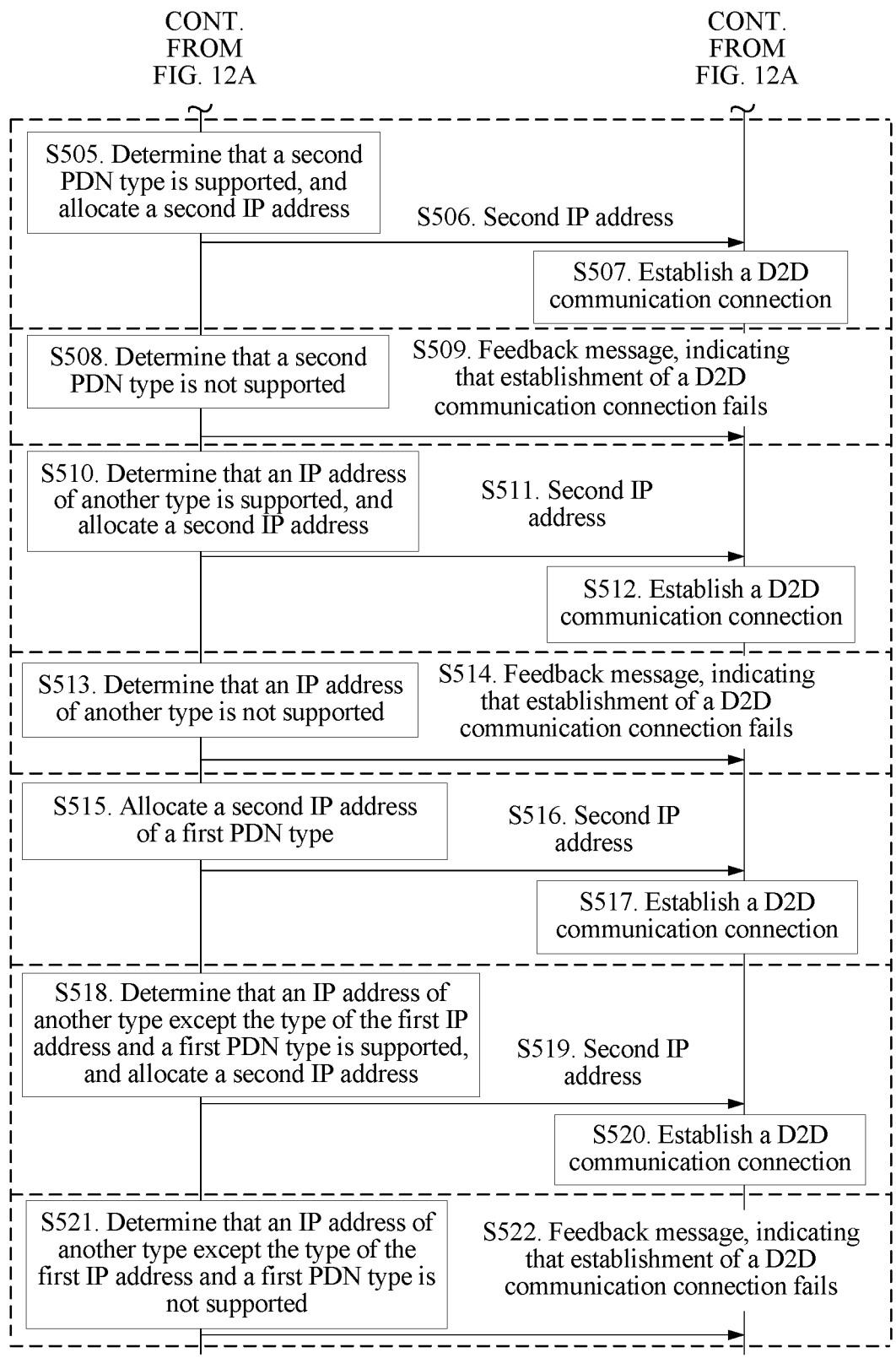

FIG. 12A and FIG. 12B are a flowchart of an IP address allocation method in D2D communication according to Embodiment 5 of the present invention. The method provided in this embodiment is executed by a first user equipment and a second user equipment that are configured to establish a D2D communication connection, and the method in this embodiment includes the following steps.

S501. The first user equipment sends a first message to the second user equipment, where the first message includes a first IP address allocated by the first user equipment to the second user equipment.

It should be noted that, the first IP address allocated by the first user equipment to the second user equipment in this embodiment may be carried in a communication establishment message for initiating D2D communication, or may be sent after the first user equipment sends a communication establishment request message. For example, the first IP address is carried in an IP address allocation message for sending. That is, the first message in this embodiment may be a communication establishment request message or an IP address allocation message.

S502. The second user equipment sends a second message to the first user equipment, where the second message is used to indicate whether allocation of the first IP address succeeds or fails.

In this embodiment, when receiving the first message that is a request message and is sent by the first user equipment, the second user equipment obtains the first IP address allocated by the first user equipment to the second user equipment. In this case, the second user equipment may know whether the first IP address is a type, of an IP address, supported by the second user equipment. However, when allocating the first IP address, the first user equipment does not know the type, of the IP address, supported by the second user equipment, that is, a type of the first IP address is randomly allocated by the first user equipment according to a capability of the first user equipment. Therefore, when the second user equipment supports the type of the first IP address, the returned second message indicates that allocation of the first IP address succeeds; or when the second user equipment does not support the type of the first IP address, the returned second message indicates that allocation of the first IP address fails. When the second user equipment does not support the type of the first IP address, for example, the type of the first IP address allocated by the first user equipment is an IPv6 type, but the second user equipment does not support an IP address of the IPv6 type, the second user equipment cannot establish a D2D communication connection to the first user equipment by using the first IP address.

Optionally, the method provided in this embodiment further includes the following step: S503. The second user equipment determines, according to the first message, that the second user equipment supports a type of the allocated first IP address, where the second message sent by the second user equipment to the first user equipment in S502 is used to indicate that allocation of the first IP address succeeds.

In another implementation manner of this embodiment, the method further includes the following step: S504. The second user equipment determines, according to the first message, that the second user equipment does not support a type of the first IP address, where the second message in S502 is specifically used to indicate that allocation of the first IP address fails, the second message includes at least one of a second PDN type or a cause value, and the second PDN type specifically indicates a type, of an IP address, that can be supported by the second user equipment. If the second message includes only the cause value, although the type, of the IP address, supported by the second user equipment is not explicitly indicated, the type, of the IP address, that can be supported by the second user equipment is implicitly indicated because a type of an IP address generally includes an IPv4 type and an IPv6 type at present. In addition, considering a factor that different types of IP addresses can be compatible with a user equipment, even if the second user equipment does not support the type of the allocated first IP address, the first user equipment may have a capability of allocating, to the second user equipment, an IP address of a type that can be supported by the second user equipment.

In specific implementation of this embodiment, after the first user equipment receives the second message indicating that allocation of the first IP address fails, an execution manner may include the following several cases. In a first case, if the second message specifically includes the second PDN type, the method provided in this embodiment further includes the following steps:

S505. If the first user equipment determines, according to the second message, that the first user equipment supports the second PDN type, the first user equipment allocates a second IP address to the second user equipment.

S506. The first user equipment sends the second IP address to the second user equipment.

S507. The second user equipment establishes a D2D communication connection between the second user equipment and the first user equipment by using the second IP address.

Optionally, in another possible implementation manner of the foregoing first case, the method further includes the following steps:

S508. The first user equipment determines, according to the second message, that the first user equipment does not support the second PDN type.

S509. The first user equipment sends a feedback message to the second user equipment, where the feedback message is used to indicate that establishment of a D2D communication connection fails.

In a second case, if the second message specifically includes the cause value but does not include the second PDN type, the method provided in this embodiment further includes the following steps:

S510. If the first user equipment determines that the first user equipment supports an IP address of another type excluding the type of the first IP address, the first user equipment allocates a second IP address to the second user equipment.

S511. The first user equipment sends the second IP address to the second user equipment.

S512. The second user equipment establishes a D2D communication connection between the second user equipment and the first user equipment by using the second IP address.

Optionally, in another possible implementation manner of the foregoing second case, the method further includes the following steps:

S513. The first user equipment determines that the first user equipment does not support an IP address of another type excluding the type of the first IP address.

S514. The first user equipment sends a feedback message to the second user equipment, where the feedback message is used to indicate that establishment of a D2D communication connection fails.

Further, in the foregoing embodiment shown in FIG. 12A and FIG. 12B, the first message sent in S501 may further include a first PDN type, that is, when the first user equipment sends the first message, a type, of an IP address, supported by the first user equipment is indicated to the second user equipment. In this case, when the second message specifically indicates that allocation of the first IP address fails, a processing manner of the first user equipment is different from those in the first case and the second case. Specifically, a manner provided in this embodiment includes the following several cases. In a third case, if the second message specifically includes the cause value, and the cause value is further used to indicate that the second user equipment supports the first PDN type, the method provided in this embodiment further includes the following steps:

S515. The first user equipment allocates a second IP address of the first PDN type to the second user equipment.

S516. The first user equipment sends the second IP address to the second user equipment.

S517. The second user equipment establishes a D2D communication connection between the second user equipment and the first user equipment by using the second IP address.

In a fourth case, if the second message specifically includes the cause value but does not include the second PDN type, and the cause value is further used to indicate that the second user equipment does not support the first PDN type, the method provided in this embodiment further includes the following steps:

S518. If the first user equipment determines that the first user equipment supports an IP address of another type excluding the type of the first IP address and the first PDN type, the first user equipment allocates a second IP address to the second user equipment.

S519. The first user equipment sends the second IP address to the second user equipment.

S520. The second user equipment establishes a D2D communication connection between the second user equipment and the first user equipment by using the second IP address.

Optionally, in another possible implementation manner of the foregoing fourth case, the method further includes the following steps:

S521. The first user equipment determines that the first user equipment does not support an IP address of another type excluding the type of the first IP address and the first PDN type.

S522. The first user equipment sends a feedback message to the second user equipment, where the feedback message is used to indicate that establishment of a D2D communication connection fails.

It should be noted that the first case to the fourth case provided in the foregoing embodiment of the present invention and various possible implementation manners of each case are executed optionally, and only one manner is selected to be performed.

Further, in the foregoing embodiments provided in the present invention, the first message sent by the first user equipment in S501 may further include an identity, and the identity may be, for example, an information element IP role carried in the first message. When the IP role is set as a server, the IP role indicates that the first user equipment is an allocator of an IP address. Correspondingly, when obtaining the IP role in the first message in S502, the second user equipment determines that the first user equipment is an allocator of an IP address in D2D communication, or determines, according to the IP role, that the second user equipment is a receiver of an IP address in D2D communication.

Furthermore, in the foregoing embodiments provided in the present invention, before S501, the method may further include the following step: S523. The first user equipment obtains a second PDN type of the second user equipment. The second PDN type may be obtained in a near field discovery process of the first user equipment and the second user equipment, so that the first user equipment can learn, according to the obtained second PDN type, the type, of the IP address, supported by the second user equipment, and allocate the first IP address to the second user equipment when the second PDN type can be compatible with the first user equipment, and the type of the first IP address is the second PDN type.

It should be noted that, the first user equipment in the foregoing embodiments of the present invention serves as an initiator of D2D communication and is responsible for allocating an IP address. In addition, the initiator of the D2D communication may also serve as a receiver of an IP address in the D2D communication. For example, a specific implementation manner is as follows: In the foregoing embodiment of the present invention, before S501, the method may further include the following steps: S524. The second user equipment sends a third message to the first user equipment. S525. The first user equipment allocates the first IP address to the second user equipment according to the third message. In this embodiment, the second user equipment is specifically an initiator of D2D communication, and the initiator of the D2D communication actually serves as a receiver of an IP address in the D2D communication.

Embodiment 6

Figure 13:
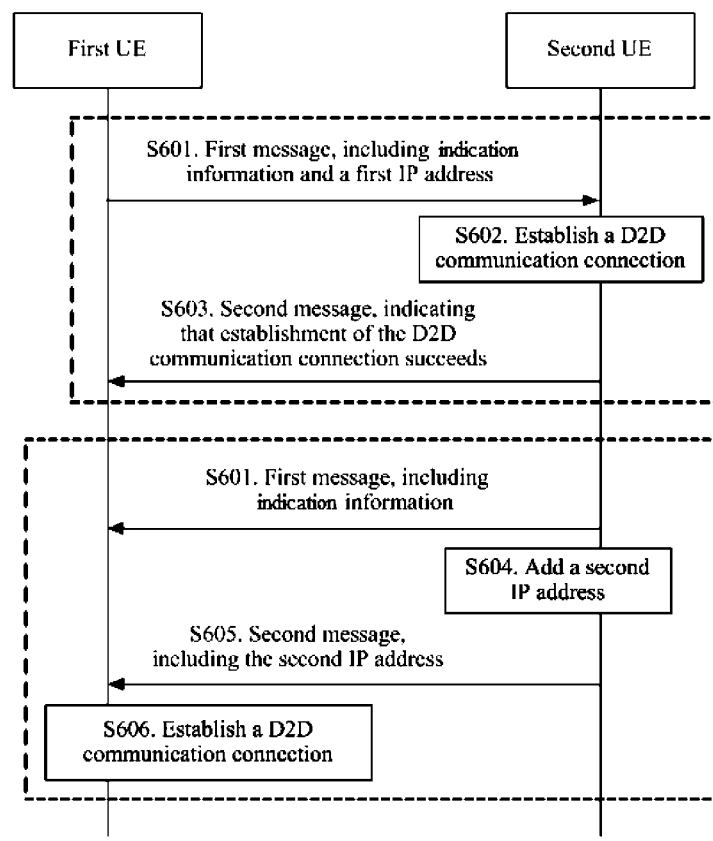
FIG. 13 is a flowchart of an IP address allocation method in D2D communication according to Embodiment 6 of the present invention.

FIG. 13 is a flowchart of an IP address allocation method in D2D communication according to Embodiment 6 of the present invention. The method provided in this embodiment is executed by a first user equipment and a second user equipment that establish a D2D communication connection, and the method in this embodiment includes the following steps.

S601. The first user equipment sends a first message to the second user equipment, where the first message includes indication information, the indication information is used to indicate that the first user equipment is to use a pre-configured first IP address, and the indication information is further used to indicate that the second user equipment is to use a pre-configured second IP address.

Optionally, if the first message in S601 in this embodiment further includes the first IP address, the method provided in this embodiment includes the following steps: S602. The second user equipment establishes a D2D communication connection to the first user equipment according to the first IP address. S603. The second user equipment sends a second message to the first user equipment, where the second message is used to indicate that establishment of the D2D communication connection succeeds. In this embodiment, when the second user equipment receives the first message, because the first message includes the first IP address, the second user equipment may serve as an establisher of D2D communication, and establish the D2D communication connection to the first user equipment.

In another possible implementation manner of this embodiment, if the first message in S601 in this embodiment does not carry the first IP address, and the indication information is further used to indicate that the first user equipment is an establisher of a D2D communication connection, the method provided in this embodiment includes the following steps: S604. The second user equipment adds the pre-configured second IP address of the second user equipment to a second message according to the first message. S605. The second user equipment sends the second message to the first user equipment. S606. The first user equipment establishes a D2D communication connection to the second user equipment according to the second IP address. In this embodiment, when the second user equipment receives the first message, because the indication information in the first message indicates that the first user equipment is the establisher of the D2D communication connection, the second user equipment sends the pre-configured second IP address of the second user equipment to the first user equipment, so that the first user equipment establishes the D2D communication connection to the second user equipment.

Further, the first message in this embodiment may further include a PDN type, the PDN type is specifically a PDN type supported by the first user equipment, and the PDN type indicates a type of an IP address used by the second user equipment. The second IP address in the second message is added by the second user equipment according to the indication information and the PDN type. In this embodiment, multiple IP addresses may be pre-configured in both the first user equipment and the second user equipment, and the multiple pre-configured IP addresses may be IP addresses of different types. Therefore, when initiating a D2D communication request to the second user equipment, the first user equipment adds a PDN type that can be compatible with the first user equipment to the first message, to indicate that the second user equipment is to send the second IP address whose type is the same as the PDN type to the first user equipment when returning the second message to the first user equipment.

Embodiment 7

Figure 14:
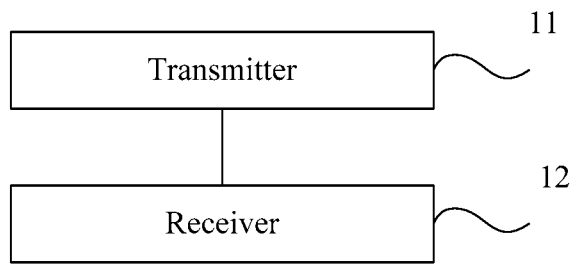
FIG. 14 is a schematic structural diagram of a user equipment according to Embodiment 7 of the present invention.

FIG. 14 is a schematic structural diagram of a user equipment according to Embodiment 7 of the present invention. The user equipment provided in this embodiment is applicable to allocation of an IP address to a peer user equipment when D2D communication is established. The user equipment may be implemented in a hardware and software manner, and may be integrated into a memory of the user equipment. For example, the user equipment is integrated into a chip of a processor, for being invoked and executed by the processor. The user equipment in this embodiment specifically includes a receiver 12 and a transmitter 11.

The transmitter 11 is configured to send a first message to the peer user equipment, where the first message includes a first IP address allocated by the user equipment to the peer user equipment.

It should be noted that, the first IP address allocated by the user equipment to the peer user equipment in this embodiment may be carried in a communication establishment message for initiating D2D communication, or may be sent after the user equipment sends a communication establishment request message. For example, the first IP address is carried in an IP address allocation message for sending. That is, the first message in this embodiment may be a communication establishment request message or an IP address allocation message.

The receiver 12 is configured to receive a second message sent by the peer user equipment, where the second message is used to indicate whether allocation of the first IP address succeeds or fails.

In this embodiment, when receiving the first message that is a request message and is sent by the user equipment, the peer user equipment obtains the first IP address allocated by the user equipment to the peer user equipment. In this case, the peer user equipment may know whether the first IP address is a type, of an IP address, supported by the peer user equipment. However, when allocating the first IP address, the user equipment does not know the type, of the IP address, supported by the peer user equipment, that is, a type of the first IP address is randomly allocated by the user equipment according to a capability of the user equipment. Therefore, when the peer user equipment supports the type of the first IP address, the returned second message indicates that allocation of the first IP address succeeds; or when the peer user equipment does not support the type of the first IP address, the returned second message indicates that allocation of the first IP address fails.

The user equipment provided in this embodiment of the present invention is configured to execute the IP address allocation method in D2D communication provided in the embodiment shown in FIG. 1 of the present invention, and has a corresponding functional module. Implementation principles and technical effects thereof are similar, and details are not described herein.

Further, when the second message indicates that allocation of the first IP address fails, the second message specifically carries at least one of a second PDN type or a cause value, and the second PDN type specifically indicates the type, of the IP address, that can be supported by the peer user equipment. If the second message includes only the cause value, although the type, of the IP address, supported by the peer user equipment is not explicitly indicated, the type, of the IP address, that can be supported by the peer user equipment is implicitly indicated because a type of an IP address generally includes an Ipv4 type and an Ipv6 type at present. In addition, considering a factor that different types of IP addresses can be compatible with the user equipment, even if the peer user equipment does not support the type of the allocated first IP address, the user equipment provided in this embodiment may have a capability of allocating, to the peer user equipment, an IP address of a type that can be supported by the peer user equipment. For example, if the user equipment supports an Ipv6 address type and the peer user equipment supports an Ipv4 address type, the first IP address allocated by the user equipment, that is, an address of an Ipv6 type, cannot be supported by the peer user equipment. However, the user equipment may further allocate an address of an Ipv4 type because of higher compatibility. Therefore, in this embodiment, the peer user equipment may further send, to an allocator of an IP address, that is, the user equipment, an information element that is used to indicate the type, of the IP address, supported by the peer user equipment, so as to indicate that the user equipment is to reallocate a second IP address to the peer user equipment, that is, the second PDN type. Therefore, the user equipment may perform subsequent IP address allocation work according to the information element in the second message.

Figure 15:
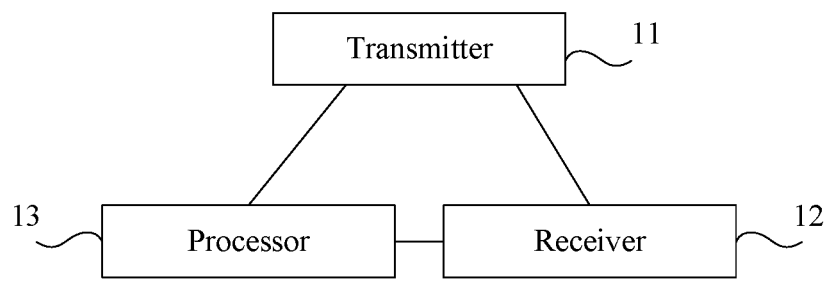
FIG. 15 is a schematic structural diagram of another user equipment according to an embodiment of the present invention.

Optionally, FIG. 15 is a schematic structural diagram of another user equipment according to an embodiment of the present invention. In this embodiment, if the second message received by a receiver 12 specifically indicates that allocation of the first IP address fails, and the second message specifically includes the second PDN type, based on the embodiment shown in FIG. 14, the user equipment provided in this embodiment further includes a processor 13, configured to allocate a second IP address to the peer user equipment when determining, according to the second message, that the user equipment supports the second PDN type; and correspondingly, the transmitter 11 is further configured to send, to the peer user equipment, the second IP address allocated by the processor 13, where the second IP address is used by the peer user equipment to establish a device-to-device (D2D) communication connection between the peer user equipment and the user equipment.

In another possible implementation manner of the embodiment shown in FIG. 15, the processor 13 is further configured to determine, according to the second message, that the user equipment does not support the second PDN type; and correspondingly, the transmitter 11 is further configured to send a feedback message to the peer user equipment, where the feedback message is used to indicate that establishment of a D2D communication connection fails.

Optionally, when the second message received by the receiver 12 in this embodiment specifically includes the cause value but does not include the second PDN type, a specific execution manner of the user equipment shown in FIG. 15 is as follows: In one aspect, the processor 13 is configured to allocate a second IP address to the peer user equipment when the user equipment supports an IP address of another type excluding the type of the first IP address; and correspondingly, the transmitter 11 is further configured to send, to the peer user equipment, the second IP address allocated by the processor 13, where the second IP address is used by the peer user equipment to establish a D2D communication connection between the peer user equipment and the user equipment. In another aspect, the processor 13 is configured to determine that the user equipment does not support an IP address of another type excluding the type of the first IP address; and correspondingly, the transmitter 11 is further configured to send a feedback message to the peer user equipment, where the feedback message is used to indicate that establishment of a D2D communication connection fails.

Optionally, when the first message sent by the transmitter 11 in this embodiment includes a first PDN type, the second message received by the receiver 12 includes the cause value, and the cause value is further used to indicate that the peer user equipment supports the first PDN type, a specific execution manner of the user equipment shown in FIG. 15 is as follows: The processor 13 is configured to allocate a second IP address of the first PDN type to the peer user equipment; and correspondingly, the transmitter 11 is further configured to send the second IP address to the peer user equipment, where the second IP address is used by the peer user equipment to establish a device-to-device (D2D) communication connection between the peer user equipment and the user equipment.

Optionally, when the first message sent by the transmitter 11 in this embodiment includes a first PDN type, the second message received by the receiver 12 includes the cause value but does not include the second PDN type, and the cause value is further used to indicate that the peer user equipment does not support the first PDN type, a specific execution manner of the user equipment shown in FIG. 15 is as follows: In one aspect, the processor 13 is configured to allocate a second IP address to the peer user equipment when the user equipment supports an IP address of another type excluding the type of the first IP address and the first PDN type; and correspondingly, the transmitter 11 is further configured to send the second IP address to the peer user equipment, where the second IP address is used by the peer user equipment to establish a D2D communication connection between the peer user equipment and the user equipment. In another aspect, the processor 13 is further configured to determine that the user equipment does not support an IP address of another type excluding the type of the first IP address and the first PDN type; and correspondingly, the transmitter 11 is further configured to send a feedback message to the peer user equipment, where the feedback message is used to indicate that establishment of a D2D communication connection fails.

The user equipment provided in this embodiment of the present invention is configured to execute the IP address allocation methods in D2D communication provided in the embodiments shown in FIG. 2 to FIG. 5, FIG. 12A, and FIG. 12B of the present invention, and has a corresponding functional module. Implementation principles and technical effects thereof are similar, and details are not described herein.

Further, in the foregoing embodiments provided in the present invention, the first message sent by the transmitter 11 may further include an identity, and the identity may be, for example, an information element IP role carried in the first message. When the IP role is set as a server, the IP role indicates that the user equipment is an allocator of an IP address. Correspondingly, when reading the IP role from the first message, the peer user equipment determines that the user equipment is an allocator of an IP address in D2D communication, or determines, according to the IP role, that the peer user equipment is a receiver of an IP address in D2D communication. In this embodiment, respective responsibilities, in an IP address allocation process, of the two user equipments that establish the D2D communication connection are explicitly specified by adding the identity. This further ensures feasibility of IP address allocation.

Furthermore, the receiver 12 in the foregoing embodiments shown in FIG. 15 is further configured to obtain a second PDN type of the peer user equipment before the transmitter 11 sends the first message to the peer user equipment. The processor 13 is further configured to allocate the first IP address to the peer user equipment according to the second PDN type of the peer user equipment, and the type of the first IP address is the second PDN type.

It should be noted that, the user equipment in the foregoing embodiments of the present invention serves as an initiator of D2D communication and is responsible for allocating an IP address. In addition, the initiator of the D2D communication may also serve as a receiver of an IP address in the D2D communication. For example, a specific implementation manner is as follows: In the foregoing embodiments shown in FIG. 15, the receiver 12 is further configured to: before the transmitter 11 sends the first message to the peer user equipment, receive a third message sent by the peer user equipment; and the processor 13 is further configured to allocate the first IP address to the peer user equipment according to the third message. In this embodiment, the user equipment is specifically an initiator of D2D communication, and the initiator of the D2D communication actually serves as a receiver of an IP address in the D2D communication.

It should be further noted that, the user equipment in the embodiments shown in FIG. 14 and FIG. 15 is a first user equipment in the foregoing embodiments shown in FIG. 1 to FIG. 8, FIG. 12A, and FIG. 12B, and the peer UE in the embodiments shown in FIG. 14 and FIG. 15 is a second user equipment in the foregoing embodiments shown in FIG. 1 to FIG. 8.

Embodiment 8

Figure 16:
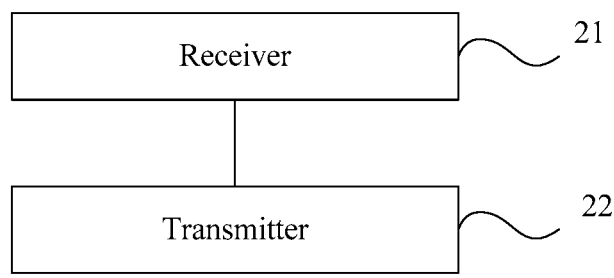
FIG. 16 is a schematic structural diagram of a user equipment according to Embodiment 8 of the present invention.

FIG. 16 is a schematic structural diagram of a user equipment according to Embodiment 8 of the present invention. The user equipment provided in this embodiment serves as a receiver of an IP address when D2D communication is established. The user equipment may be implemented in a hardware and software manner, and may be integrated into a memory of the user equipment. For example, the user equipment is integrated into a chip of a processor, for being invoked and executed by the processor. The user equipment in this embodiment specifically includes a receiver 21 and a transmitter 22.

The receiver 21 is configured to receive a first message sent by a peer user equipment, where the first message includes a first IP address allocated by the peer user equipment to the user equipment.

It should be noted that, the first IP address that is allocated by the peer user equipment and received by the user equipment in this embodiment may be carried in a communication establishment message for initiating D2D communication, or may be sent after the peer user equipment sends a communication establishment message. For example, the first IP address is carried in an IP address allocation message for sending. That is, the first message in this embodiment may be a communication establishment message or an IP address allocation message.

The transmitter 22 is configured to send a second message to the peer user equipment, where the second message is used to indicate whether allocation of the first IP address succeeds or fails.

In this embodiment, the user equipment obtains the first IP address allocated by the peer user equipment to the user equipment, and the user equipment may know whether the first IP address is a type, of an IP address, supported by the user equipment. However, when allocating the first IP address, the peer user equipment does not know the type, of the IP address, supported by the user equipment, that is, a type of the first IP address is randomly allocated by the peer user equipment according to a capability of the peer user equipment. Therefore, when the user equipment provided in this embodiment supports the type of the first IP address, the returned second message indicates that allocation of the first IP address succeeds; or when the user equipment does not support the type of the first IP address, the returned second message indicates that allocation of the first IP address fails.

The user equipment provided in this embodiment of the present invention is configured to execute the IP address allocation method in D2D communication provided in the embodiment shown in FIG. 6 of the present invention, and has a corresponding functional module. Implementation principles and technical effects thereof are similar, and details are not described herein.

Figure 17:
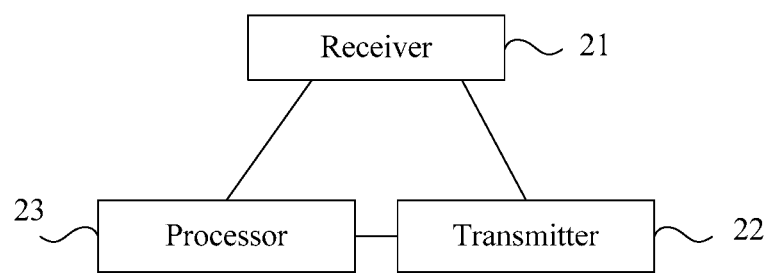
FIG. 17 is a schematic structural diagram of another user equipment according to an embodiment of the present invention.

In specific implementation of the foregoing embodiment of the present invention, the user equipment determines indication information in the returned second message according to the type of the received first IP address and a first PDN type that may be carried in the first message. FIG. 17 is a schematic structural diagram of another user equipment according to an embodiment of the present invention, and FIG. 17 is a further description based on the embodiment shown in FIG. 16. Optionally, the user equipment provided in this embodiment further includes a processor 23, and that the transmitter 22 is configured to send the second message to the peer user equipment specifically includes the following cases. In one aspect, if allocation of the first IP address succeeds, the transmitter 22 is specifically configured to send the second message to the peer user equipment when the processor 23 determines that the user equipment supports a type of the first IP address, where the second message is used to indicate that allocation of the first IP address succeeds. In another aspect, a case in which allocation of the first IP address fails includes the following cases. In a first case, the transmitter 22 is specifically configured to send the second message to the peer user equipment when the processor 23 determines, according to the first message, that the user equipment does not support a type of the first IP address, where the second message is used to indicate that allocation of the first IP address fails, the second message includes at least one of a second packet data network (PDN) type or a cause value, the cause value is used to indicate that the user equipment does not support the type of the first IP address, and the second PDN type is used to indicate a type, of an IP address, supported by the user equipment. In a second case, the transmitter 22 is specifically configured to send the second message to the peer user equipment when the first message further includes a first PDN type, and the processor 23 determines, according to the first message, that the user equipment does not support a type of the first IP address but the user equipment supports the first PDN type, where the second message is used to indicate that allocation of the first IP address fails, the second message includes at least one of a second PDN type or a cause value, and the cause value is used to indicate that the user equipment does not support the type of the first IP address but the user equipment supports the first PDN type. In a third case, the transmitter 22 is specifically configured to send the second message to the peer user equipment when the first message further includes a first PDN type, and the processor 23 determines, according to the first message, that the user equipment supports neither a type of the first IP address nor the first PDN type, where the second message is used to indicate that allocation of the first IP address fails, the first PDN type is used to indicate a type, of an IP address, supported by the peer user equipment, the second message includes at least one of a second PDN type or a cause value, the cause value is used to indicate that the user equipment supports neither the type of the first IP address nor the first PDN type, and the second PDN type is used to indicate a type, of an IP address, supported by the user equipment.

In the foregoing three cases in which allocation of the first IP address fails, the peer user equipment specifically determines, according to compatibility of the peer user equipment, whether the peer user equipment may continue to allocate a second IP address to the user equipment provided in this embodiment. A specific manner of determining is described in detail in the foregoing embodiment, and details are not described herein. The receiver 21 in this embodiment is further configured to receive a second IP address sent by the peer user equipment, where the second IP address is used by the user equipment to establish a device-to-device (D2D) communication connection between the user equipment and the peer user equipment. Alternatively, the receiver 21 is further configured to receive a feedback message sent by the peer user equipment, where the feedback message is used to indicate that establishment of a D2D communication connection fails.

The user equipment provided in this embodiment of the present invention is configured to execute the IP address allocation methods in D2D communication provided in the embodiments shown in FIG. 7 and FIG. 8 of the present invention, and has a corresponding functional module. Implementation principles and technical effects thereof are similar, and details are not described herein.

Further, in the foregoing embodiments provided in the present invention, the first message received by the receiver 21 further includes an identity, and the processor 23 is further configured to determine, according to the identity, that the peer user equipment is an allocator of an IP address in D2D communication or that the user equipment is a receiver of an IP address in D2D communication. In this embodiment, respective responsibilities, in an IP address allocation process, of the two user equipments that establish the D2D communication connection are explicitly specified by adding the identity. This further ensures feasibility of IP address allocation.

It should be noted that, the user equipment in the foregoing embodiments of the present invention serves as a receiver of an IP address in D2D communication, and the peer user equipment serves as an initiator of the D2D communication and is responsible for allocating an IP address. Similar to the foregoing embodiments, the initiator of the D2D communication may also serve as the receiver of the IP address in the D2D communication. For example, a specific implementation manner is as follows: In the foregoing embodiments of the present invention, the transmitter 22 is further configured to send a third message to the peer user equipment before the receiver 21 receives the first message sent by the peer user equipment, where the third message is used to request the peer user equipment to allocate the first IP address to the user equipment. The user equipment provided in this embodiment is specifically an initiator of D2D communication, and the initiator of the D2D communication actually serves as a receiver of an IP address in the D2D communication.

It should be further noted that, the user equipment in the embodiments shown in FIG. 16 and FIG. 17 is a second user equipment in the foregoing embodiments shown in FIG. 1 to FIG. 8, FIG. 12A, and FIG. 12B, and the peer user equipment in the embodiments shown in FIG. 16 and FIG. 17 is a first user equipment in the foregoing embodiments shown in FIG. 1 to FIG. 8.

Embodiment 9

Figure 18:
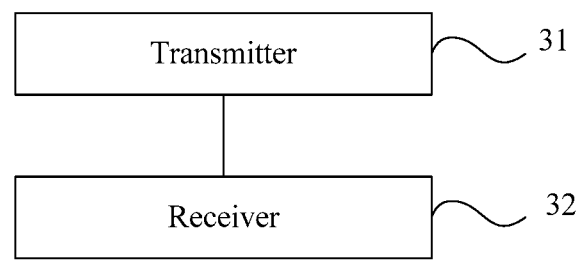
FIG. 18 is a schematic structural diagram of a user equipment according to Embodiment 9 of the present invention.

FIG. 18 is a schematic structural diagram of a user equipment according to Embodiment 9 of the present invention. The user equipment provided in this embodiment is applicable to D2D communication. The user equipment may be implemented in a hardware and software manner, and may be integrated into a memory of the user equipment. For example, the user equipment is integrated into a chip of a processor, for being invoked and executed by the processor. The user equipment in this embodiment specifically includes a transmitter 31 and a receiver 32.

The transmitter 31 is configured to send a first message to peer user equipment, where the first message includes a first IP address and indication information, the indication information is used to indicate that the user equipment is to use the first IP address, the indication information is further used to indicate that the peer user equipment is to use a second IP address, and the first message is used to request the peer user equipment to establish a device-to-device (D2D) communication connection to the user equipment according to the first IP address.

In this embodiment, the first IP address is pre-configured in the user equipment, and the second IP address is pre-configured in the peer user equipment. For example, the user equipment and the peer user equipment have performed group communication before D2D communication, and the user equipment and the peer user equipment each have configured IP addresses. In this case, if the user equipment and the peer user equipment need to perform the D2D communication, the configured IP addresses used in the group communication may be directly used without a need to allocate an IP address. Specifically, the user equipment serves as an initiator of the D2D communication, and when initiating the D2D communication, the user equipment adds the configured first IP address of the user equipment and the indication information to the first message. For example, when the indication information is set to be pre-configured, the indication information indicates that the user equipment is to use the first IP address and indicates that the second user equipment is to use the second IP address. The peer user equipment may establish the D2D communication connection between the second user equipment and the user equipment according to the indication information and the first IP address.

It should be noted that, the user equipment in this embodiment indicates, by using the first message, that the peer user equipment is to establish the D2D communication connection by using the first IP address carried in the first message.

The first IP address may be carried in a communication establishment message for initiating D2D communication, or may be sent after the user equipment sends a communication establishment message. For example, the first IP address is carried in an IP address sending message for sending. That is, the first message in this embodiment may be a communication establishment message or an IP address sending message.

The receiver 32 is configured to receive a second message sent by the peer user equipment, where the second message is used to indicate that establishment of the D2D communication connection succeeds.

The user equipment provided in this embodiment of the present invention is configured to execute the IP address allocation method in D2D communication provided in the embodiment shown in FIG. 9 of the present invention, and has a corresponding functional module. Implementation principles and technical effects thereof are similar, and details are not described herein.

In another possible implementation manner of the foregoing embodiment shown in FIG. 18, a first message sent by the transmitter 31 includes only indication information, where the indication information is used to indicate that the user equipment is to use a first IP address, the indication information is further used to indicate that peer user equipment is to use a second IP address, and the indication information is further used to indicate that the user equipment is an establisher of a device-to-device (D2D) communication connection. That is, the user equipment in this embodiment needs to obtain an IP address of the peer user equipment in D2D communication, that is, the peer user equipment is notified to send a pre-configured second IP address of the peer user equipment to the user equipment.

Correspondingly, the receiver 32 is configured to receive a second message sent by the peer user equipment, where the second message specifically includes the second IP address, so that the user equipment establishes a device-to-device (D2D) communication connection to the peer user equipment according to the second IP address.

It should be noted that, the peer user equipment in this embodiment sends the pre-configured second IP address of the peer user equipment to the user equipment by using the received first message that includes the indication information, to establish the D2D communication connection. The indication information may be carried in a communication establishment message for initiating D2D communication, or may be sent after the user equipment sends a communication establishment message. For example, the indication information is carried in an IP address sending message for sending. That is, the first message in this embodiment may be a communication establishment message or an IP address sending message.

Further, in this embodiment, the first message sent by the transmitter 31 may further include a PDN type, the PDN type is specifically a PDN type supported by the user equipment, and the PDN type indicates a type of an IP address used by the peer user equipment. The second IP address in the second message is added by the peer user equipment according to the indication information and the PDN type. In this embodiment, multiple IP addresses may be pre-configured in both the user equipment and the peer user equipment, and the multiple pre-configured IP addresses may be IP addresses of different types. Therefore, when initiating a D2D communication request to the peer user equipment, the user equipment adds a PDN type that can be compatible with the user equipment to the first message, to indicate that the peer user equipment is to send the second IP address whose type is the same as the PDN type to the user equipment when returning the second message to the user equipment.

The user equipment provided in this embodiment of the present invention is configured to execute the IP address allocation method in D2D communication provided in the embodiment shown in FIG. 10 of the present invention, and has a corresponding functional module. Implementation principles and technical effects thereof are similar, and details are not described herein.

It should be noted that, the user equipment in the embodiments shown in FIG. 18 is a first user equipment in the foregoing embodiments shown in FIG. 9, FIG. 10, and FIG. 13, and the peer user equipment in the embodiments shown in FIG. 18 is a second user equipment in the foregoing embodiments shown in FIG. 9, FIG. 10, and FIG. 13.

Persons of ordinary skill in the art may understand that all or some of the steps of the foregoing method embodiments may be implemented by a program instructing relevant hardware. The foregoing program may be stored in a computer-readable storage medium. When the program runs, the steps of the foregoing method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended to describe technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention. Additionally, statements made herein characterizing the invention refer to an embodiment of the invention and not necessarily all embodiments.

What is claimed is:

1. A method for device-to-device (D2D) communication connection establishment, the method comprising:
sending, by a first user equipment, a request to a second user equipment requesting that the second user equipment establish a D2D communication connection with the first user equipment, wherein the request comprises a first IP address pre-configured in the first user equipment and indication information, wherein the indication information indicates that, for the D2D communication connection, the first user equipment will use the first IP address pre-configured in the first user equipment and that the second user equipment is to use a second IP address pre-configured in the second user equipment; and
receiving, by the first user equipment, a response from the second user equipment, wherein the response comprises the second IP address pre-configured in the second user equipment, and the response indicates successful establishment of the D2D communication connection.

2. The method according to claim 1, wherein the request further comprises a packet data network (PDN) type, wherein the PDN type indicates a type of an IP address used by the second user equipment; and
wherein the second IP address in the response is added by the second user equipment according to the indication information and the PDN type.

3. A user equipment, comprising a processor and a non-transitory memory having processor-executable instructions stored thereon, wherein the processor-executable instructions, when executed by the processor, facilitate:
sending a request to a peer user equipment requesting that the peer user equipment establish a D2D communication connection with the user equipment, wherein the request comprises a first IP address pre-configured in the user equipment and indication information, wherein the indication information indicates that, for the D2D communication connection, the user equipment will use the first IP address pre-configured in the user equipment and that the peer user equipment is to use a second IP address pre-configured in the peer user equipment; and
receiving a response from the peer user equipment, wherein the response comprises the second IP address pre-configured in the peer user equipment, and the response indicates successful establishment of the D2D communication connection.

4. The user equipment according to claim 3, wherein the request further comprises a packet data network (PDN) type, wherein the PDN type indicates a type of an IP address used by the peer user equipment; and
wherein the peer user equipment is configured to add the second IP address in the response according to the indication information and the PDN type.

5. A method for device-to-device (D2D) communication connection establishment, the method comprising:
receiving, by a second user equipment, a request from a first user equipment requesting that the second user equipment establish a D2D communication connection with the first user equipment, wherein the request comprises a first IP address pre-configured in the first user equipment and indication information, wherein the indication information indicates that, for the D2D communication connection, the first user equipment will use the first IP address pre-configured in the first user equipment and that the second user equipment is to use a second IP address pre-configured in the second user equipment; and
sending, by the second user equipment, a response to the first user equipment, wherein the response comprises the second IP address pre-configured in the second user equipment, and the response indicates successful establishment of the D2D communication connection.

6. The method according to claim 5, wherein the request further comprises a packet data network (PDN) type, wherein the PDN type indicates a type of an IP address used by the second user equipment; and
wherein the second IP address in the response is added by the second user equipment according to the indication information and the PDN type.

7. A user equipment, comprising a processor and a non-transitory memory having processor-executable instructions stored thereon, wherein the processor-executable instructions, when executed by the processor, facilitate:
receiving a request from a peer user equipment requesting that the user equipment establish a D2D communication connection with the peer user equipment, wherein the request comprises a first IP address pre-configured in the peer user equipment and indication information, wherein the indication information indicates that, for the D2D communication connection, the peer user equipment will use the first IP address pre-configured in the peer user equipment and that the user equipment is to use a second IP address pre-configured in the user equipment;

sending a response to the peer user equipment, wherein the response comprises the second IP address pre-configured in the user equipment, and the response indicates successful establishment of the D2D communication connection.

8. The user equipment according to claim 7, wherein the request further comprises a packet data network (PDN) type, wherein the PDN type indicates a type of an IP address used by the user equipment; and wherein the user equipment is configured to add the second IP address in the response according to the indication information and the PDN type.

* * * * *

UNITED STATES PATENT AND TRADEMARK OFFICE
CERTIFICATE OF CORRECTION

PATENT NO. : 10,798,054 B2
APPLICATION NO. : 15/816693
DATED : October 6, 2020
INVENTOR(S) : Zhou et al.

It is certified that error appears in the above-identified patent and that said Letters Patent is hereby corrected as shown below:

On the Title Page

Page 2, item (56) U.S. Patent Documents: Citation 42: "2015/0282236 A1 10/2015 Chat et al." should read -- 2015/0282236 A1 10/2015 Chai et al. --.

Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*